(12) United States Patent
Kho et al.

(10) Patent No.: US 6,844,966 B2
(45) Date of Patent: Jan. 18, 2005

(54) FUSION MONITOR SYSTEM FOR VEHICLES

(76) Inventors: Myung-Duk Kho, Kangnam Apt. 18-40, 1648, Sinlim 8-Dong, Gwanak-Gu, Seoul 151-018 (KR); Jung-Hyun Kho, 804-25, Daelim-Dong, Yongdungpo-Gu, Seoul 150-070 (KR)

( * ) Notice: Subject to any disclaimer, the term of this patent is extended or adjusted under 35 U.S.C. 154(b) by 204 days.

(21) Appl. No.: 10/253,019

(22) Filed: Sep. 23, 2002

(65) Prior Publication Data

US 2003/0026010 A1 Feb. 6, 2003

Related U.S. Application Data

(63) Continuation-in-part of application No. PCT/KR01/00533, filed on Mar. 30, 2001.

(30) Foreign Application Priority Data

Mar. 30, 2000 (KR) .................................. 10-2000-0016604
Sep. 21, 2000 (KR) .................................. 10-2000-0055529

(51) Int. Cl.[7] .......................... G02B 23/02; G02B 5/04; G02B 5/08; H04M 1/00; B60R 1/02
(52) U.S. Cl. ....................... 359/402; 359/431; 359/834; 359/861; 359/877; 455/569.2; 455/575.9
(58) Field of Search ................................. 359/399, 400, 359/402, 431, 833, 834, 841, 857, 861, 871, 872, 877; 455/569.2, 575.9

(56) References Cited

U.S. PATENT DOCUMENTS

| | | | | |
|---|---|---|---|---|
| 2,288,619 A | * | 7/1942 | Gardner | |
| 2,501,067 A | * | 3/1950 | Lusebrink | |
| 5,037,182 A | | 8/1991 | Groves et al. | |
| 5,264,962 A | * | 11/1993 | Kho | |
| 5,278,695 A | * | 1/1994 | Gebelein et al. | |
| 5,541,762 A | * | 7/1996 | Levy | |
| 5,550,673 A | * | 8/1996 | Goldstein | |
| 5,594,593 A | * | 1/1997 | Milner | |
| 5,617,245 A | * | 4/1997 | Milner | |
| 6,101,048 A | * | 8/2000 | Wheeler | |
| 6,362,918 B1 | * | 3/2002 | Netzer | |
| 6,424,448 B1 | * | 7/2002 | Levy | |
| 6,424,474 B1 | * | 7/2002 | Milner | |
| 6,590,725 B2 | * | 7/2003 | Kho | |

FOREIGN PATENT DOCUMENTS

| | | |
|---|---|---|
| JP | 61146447 | 7/1986 |
| JP | 1247235 | 10/1989 |
| JP | 8295177 | 11/1996 |
| WO | WO 01/76911 | * 10/2001 |

OTHER PUBLICATIONS

International Search Report for PCT/KR 01/00533; Jul. 13, 2001.

* cited by examiner

Primary Examiner—Ricky D. Shafer
(74) Attorney, Agent, or Firm—Graybeal Jackson Haley LLP

(57) ABSTRACT

A fusion monitor system for vehicles which includes a sideview mirror unit having an object lens and an eye lens at both sides of a housing which is disposed backwardly from inside and outside of the vehicle and a movable reflecting mirror between two lenses to form an afocal optical system, a movable reflecting mirror driving unit for rotating the movable reflecting mirror, a terminal holder for accepting a mobile phone, a display panel for outputting the same information as that of a display window of the mobile phone through the mirror unit. According, air resistance can be reduced, information outputted on the display window of the mobile phone can be enlarged for easy viewing and reading, and it allows hands free for user's convenience.

38 Claims, 18 Drawing Sheets

FUSION MONITOR SYSTEM FOR VEHICLES

CROSS-REFERENCE TO RELATED APPLICATIONS

This is a continuation-in-part application which claims priority from PCT/KR01/00533, published in English, filed Mar. 30, 2001, based on Korean patent application 2000-16604, filed Mar. 30, 2000, and Korean patent application 2000-55529, filed Sep. 21, 2000; this application also claims priority from Korean Application No. 2000-16604, filed Mar. 30, 2000, and from Korean Application No. 2000-55529, filed Sep. 21, 2000.

TECHNICAL FIELD

The present invention relates to a sideview mirror apparatus for vehicles, and particularly, to a fusion monitor system for vehicles by which a length protruded to car width directions out of a vehicle is able to be reduced, whereby an air resistance can be reduced, information outputted on a display screen of a mobile phone or information received from a wireless sensor located in the vehicle can be viewed on the mirror as enlarged, and a user is able to use the mirror using a hands free kit.

BACKGROUND OF THE INVENTION

Generally, a conventional sideview mirror for vehicles is a planar reflector type having an almost plane reflecting surface, and is protruded beyond the front body of the vehicle horizontally with respect to a forward-backward axis of the vehicle body, which causes an air resistance. Such an air resistance increases fuel consumption of the vehicle, and increases discharge amount of pollutants caused by an incomplete combustion.

Also, the conventional planar reflector type sideview mirror has a relatively small rear viewing angle, and it may be exposed to water drops, moisture and frost in bad weather such as rainy or snowy weather, thereby making it difficult for the driver to view the rear.

Considering these problems, a sideview mirror capable of reducing the length protruded beyond the body of the vehicle and increasing the rear view angle using an optical element is disclosed.

However, the conventional sideview mirrors for vehicles using an optical element have a relatively complex structure, and a driver is not able to view a material precisely because the material is distorted.

Accordingly, a sideview mirror for vehicles directed to solve these conventional problems is disclosed in Korean Utility Model Publication No. 76588 and U.S. Pat. No. 5,264,962 by the applicant of the present invention.

On the other hand, hand held terminals such as GPS (Global Positioning System) receiver and PDA (Personal Digital Assistant) are distributed rapidly, and the number of mobile phone users are even more than the number of wire telephone users in Korea.

A user is able to search the internet using the mobile phone, and is able to receive various services such as mapping information and location information.

Recently, the user is able to connect to the internet using a mobile phone including a web browser by connecting to a base station using the mobile phone. In addition, so-called next generation motion picture mobile phones by which vehicle navigation, video telephone, and bidirectional TV, as well as the internet service, can be provided because a video service including voice, letters, and motion pictures are able to be served.

On the other hand, using a mobile phone while driving may cause a traffic accident, accordingly, a regulation is needed to prevent the accident caused by using the mobile phone in some countries such as US and Japan. In addition, in some countries, legislation for compulsory use of a hands-free kit (which is designed in order to call/receive without holding the phone) is being put forward.

However, the respective hand-held terminals, including the conventional mobile phones, are designed as small and light in consideration of convenience for carrying. Accordingly, if a user is served information about digital map service using a general hands-free kit, the user is not able to read the information displayed on the screen easily because the screen is relatively small and the user views the information from a distance.

SUMMARY OF THE INVENTION

Therefore, an objective of the present invention is to provide a fusion monitor system for vehicles by which an air resistance is able to be reduced by reducing a length protruded out of a vehicle, reading information is made easy by enlarging information outputted on display screen of a mobile phone, information received from a wireless sensor located in the vehicle could be read, and convenience for a user is improved by using a hands-free kit.

In order to achieve the above objects, there is provided a fusion monitor system for vehicles comprising: a sideview mirror unit including a housing of a cylindrical shape having one end disposed outside of a vehicle toward rear side, the other end disposed inside the vehicle toward the rear side, and a perspective window formed inside the vehicle where opposing with the inner end so that a ray is able to be transmitted, an object lens system disposed on outer end part of the housing and refracting the passed ray to be converged, an upper reflecting unit and a lower reflecting unit arranged in the housing at a predetermined angle within the focal length of the object lens so that a reciprocal contact line corresponds to a horizontal center line of the object lenses and interior angles arranged to make a right angle, a movable reflecting mirror unit having a planar reflecting surface and disposed at a certain angle beyond the focal length of the object lens system so as to open/close the perspective window, for reflecting the ray reflected from the upper reflecting unit and from the lower reflecting unit to inner end part of the housing, and an eye lens system disposed on inner end part of the housing for refracting the ray so that the image reflected by the movable reflecting mirror unit is enlarged whereby forming an afocal optical system with the object lens system; a movable reflecting mirror driving unit for driving the movable reflecting mirror unit between the opening position and the reflecting position; a terminal holder having a terminal acceptance space inside so that a part of a mobile phone is able to be accepted and disposed one side of the housing; and a display panel having a display surface outputting same information as on a display window of the mobile phone through a data communication with the terminal holder when the mobile phone is inserted into the terminal acceptance space, and coupled to the outer part of the housing so that the display surface of the display panel faces the perspective window.

There is provided a fusion monitor system for vehicles according to another embodiment comprising: a sideview mirror unit including a housing of a cylindrical shape having one end disposed outside of a vehicle toward rear side, the other end disposed inside the vehicle toward the rear side, and a perspective window formed inside the vehicle where opposing with the inner end so that a ray is able to be transmitted, an object lens system disposed on outer end part of the housing and refracting the passed ray to be converged, an upper reflecting unit and a lower reflecting unit arranged in the housing at a predetermined angle within the focal length of the object lens so that a reciprocal contact line corresponds to a horizontal center line of the object lenses and interior angles arranged to make a right-angle, a fixed reflecting mirror unit having a planar reflecting surface and disposed at a certain angle out of the focal length of the object lens system so that the perspective window can be viewed through the inner end part of the housing for reflecting the ray reflected from the upper reflecting unit and from the lower reflecting unit to inner end part of the housing; and an eye lens system disposed on inner end part of the housing for refracting the ray so that the image reflected by the fixed reflecting mirror unit is enlarged whereby forming an afocal optical system with the object lens system; a terminal holder having a terminal acceptance space inside so that a part of a mobile phone is able to be accepted and disposed one side of the housing; and a display panel having a display surface outputting same information as on a display window of the mobile phone through a data communication with the terminal holder when the mobile phone is inserted into the terminal acceptance space and coupled to the outer part of the housing so that the display surface of the display panel faces the perspective window.

There is provided a fusion monitor system for vehicles according to still another embodiment of the present invention comprising: a sideview mirror unit including a housing of a cylindrical shape having one end disposed outside of a vehicle toward rear side, the other end disposed inside the vehicle toward the rear side, an object lens system disposed on outer end part of the housing and refracting the passed ray to be converged, an upper reflecting unit and a lower reflecting unit arranged in the housing at a predetermined angle within the focal length of the object lens so that a reciprocal contact line corresponds to a horizontal center line of the object lenses and interior angles arranged to make a right-angle, a third reflecting unit disposed out of the focal length of the object lens system for reflecting the ray reflected from the upper reflecting unit and from the lower reflecting unit to the inner end part of the housing, an eye lens system disposed on inner end part of the housing and for forming an afocal optical system with the object lens system by refracting the ray so that the image reflected by the third reflecting unit is enlarged; a terminal holder having a terminal acceptance space inside so that a part of a mobile phone is able to be accepted and disposed one side of the housing; a display panel having a display surface outputting same information as on a display window of the mobile phone through a data communication with the terminal holder when the mobile phone is inserted into the terminal acceptance space, and disposed between the third reflecting unit and the eye lens system so that the image reflected on the third reflecting unit and the display surface are able to be viewed through the eye lens system at the same time.

There is also provided a fusion monitor system according to still another embodiment of the present invention comprising: a sideview mirror unit including a housing of a cylindrical shape having one end disposed outside of a vehicle toward rear side, the other end disposed inside the vehicle toward the rear side, an object lens system disposed on outer end part of the housing and refracting the passed ray to be converged, an upper reflecting unit and a lower reflecting unit arranged in the housing at a predetermined angle within the focal length of the object lens so that a reciprocal contact line corresponds to a horizontal center line of the object lenses and interior angles arranged to make a right-angle, a third reflecting unit disposed out of the focal length of the object lens system for reflecting the ray reflected from the upper reflecting unit and from the lower reflecting unit to the inner end part of the housing, an eye lens system disposed on inner end part of the housing and for forming an afocal optical system with the object lens system by refracting the ray so that the image reflected by the third reflecting unit is enlarged; a terminal holder having a terminal acceptance space inside so that a part of a mobile phone is able to be accepted and disposed one side of the housing; a display panel having a display surface outputting information same as that on a display window of the mobile phone through a data communication with the terminal holder when the mobile phone is inserted into the terminal acceptance space, and installed so as to rotate between output position disposed between the third reflecting unit and the eye lens system so that the display surface faces the eye lens system and a retraction position disposed on inner wall of the housing; and a panel driving means making the display panel rotate between the output position and the retraction position.

DETAILED DESCRIPTION OF THE INVENTION

Embodiments of the present invention will now be described with reference to accompanying drawings.

Figure 1:
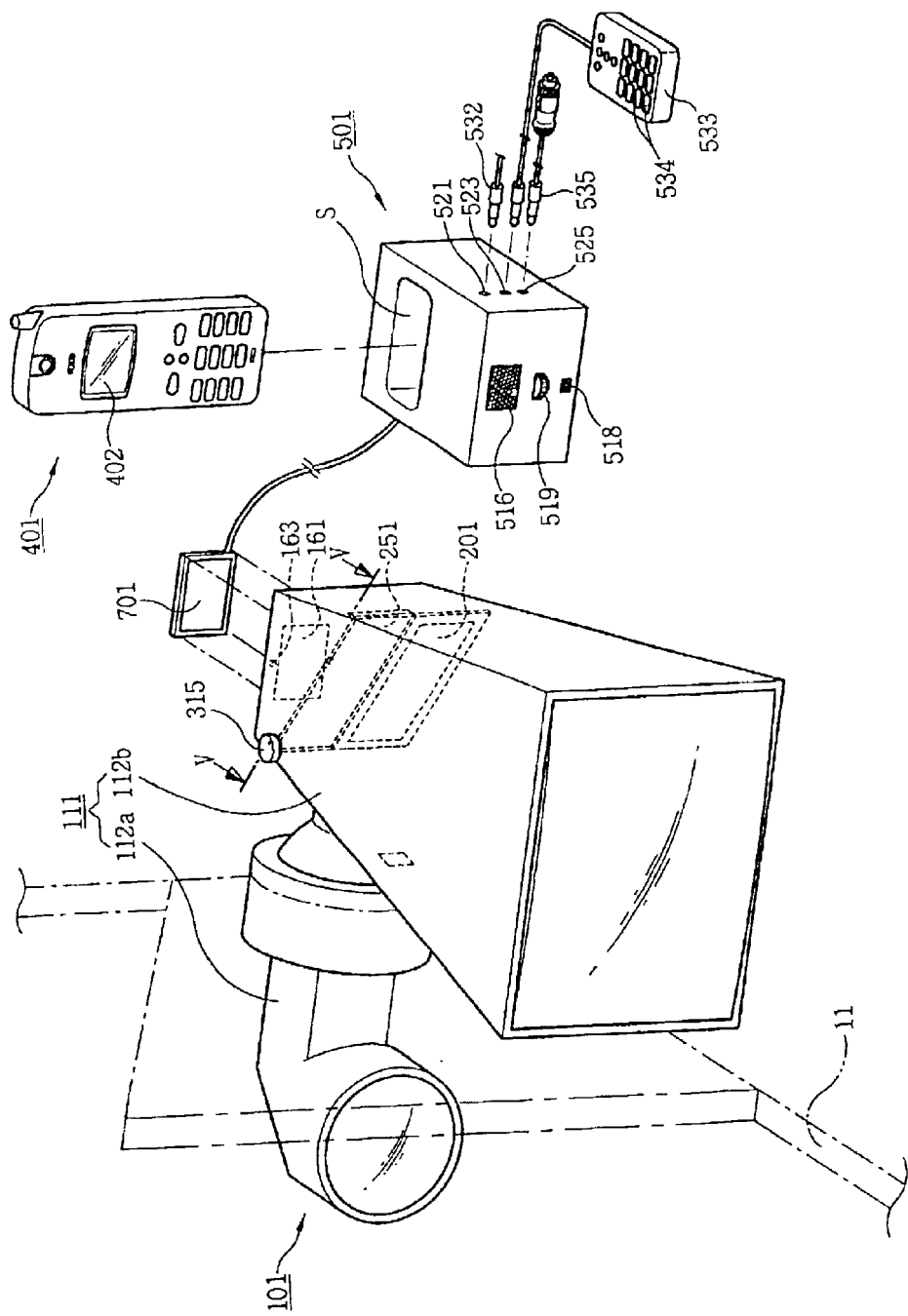
FIG. 1 is an exploded perspective view showing a fusion monitor system for vehicles according to a first embodiment of the present invention.
Figure 2:
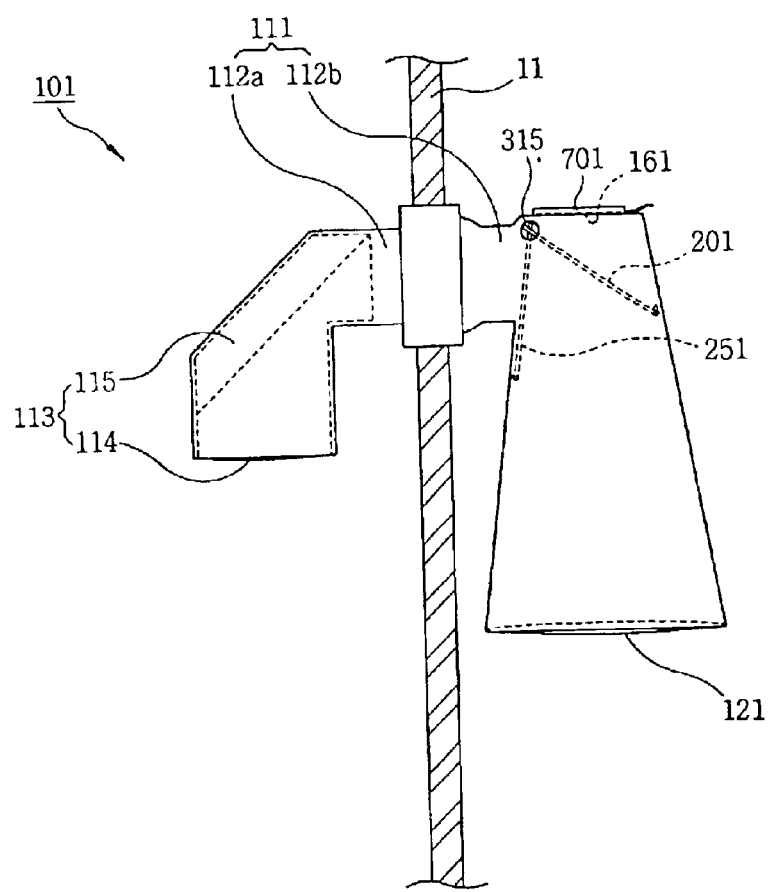
FIG. 2 is a plan cross-sectional view showing the fusion monitor system in FIG. 1.
Figure 3:
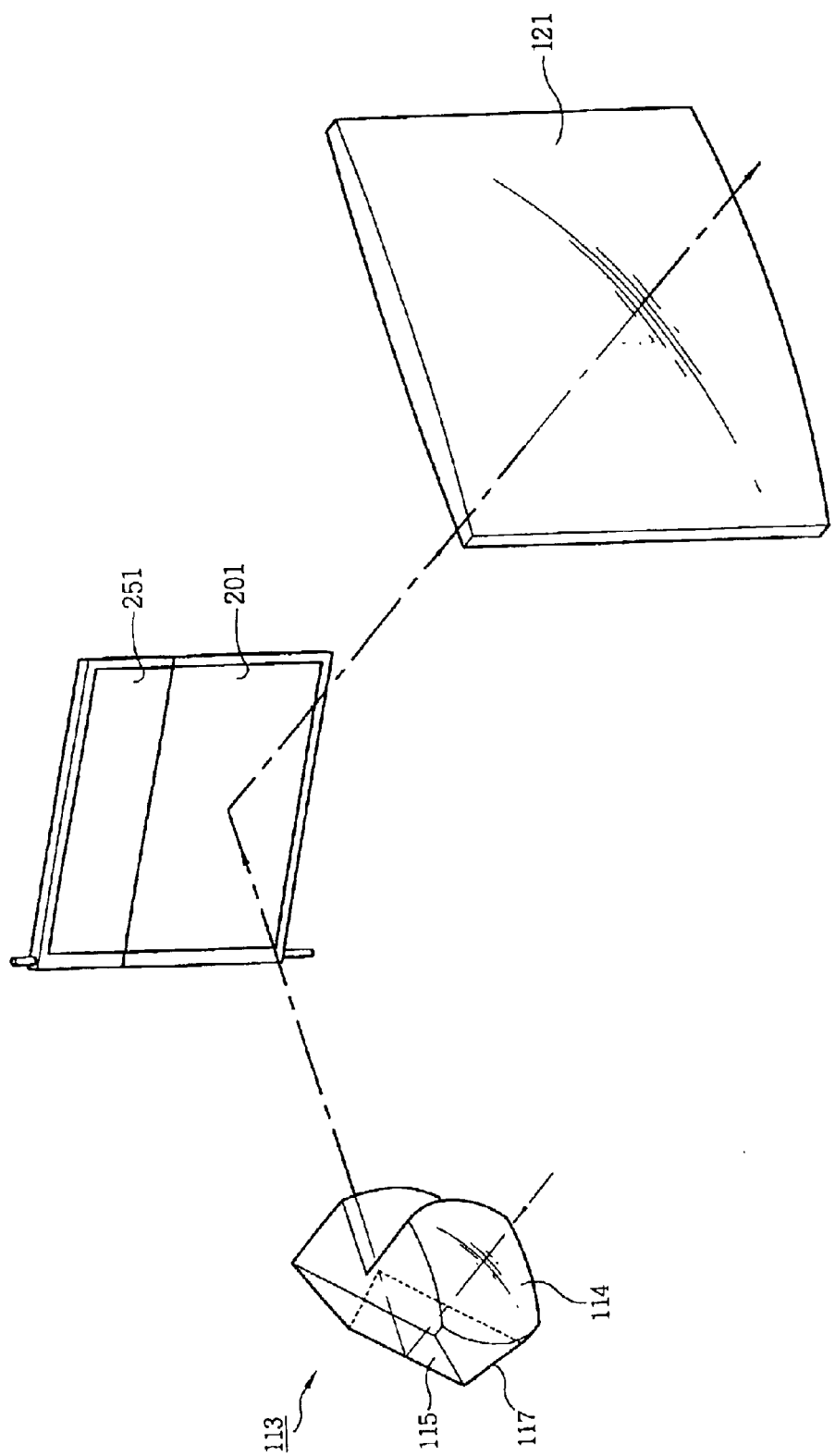
FIG. 3 is a drawing showing a structure of the sideview mirror unit in FIG. 2.

FIG. 1 is an exploded perspective view showing a fusion monitor system for vehicles according to the first embodiment of the present invention, and FIG. 2 is a plane cross-sectional view showing the fusion monitor system in FIG. 1, and FIG. 3 is a diagram showing a rough structure of the sideview mirror unit in FIG. 2.

As shown therein, the fusion monitor system for vehicles comprises: a sideview mirror unit 101 including a housing 111 having an end disposed outside of a vehicle 11 and the other end disposed inside the vehicle 11, an object lens system and an eye lens system disposed on outer end part and on inner end part of the housing 111 respectively for forming an afocal optical system, a fixed reflecting mirror unit 201 and a movable reflecting mirror unit 251 disposed between the object lens system and the eye lens system for reflecting ray on the object lens system to the eye lens system; a movable reflecting mirror driving unit for driving the movable reflecting mirror unit between a reflecting position reflecting the ray cooperatively with the fixed reflecting mirror unit 201 and a retracting position retracted so that a perspective window, which will be described, is able to be opened; a display panel 701 coupled to the perspective window 161 formed on inner wall of the housing 111 and outputting information same as that outputted on the display window 402 of a mobile phone 401; and a terminal holder 501 having an acceptance space for accepting a part of the mobile phone 401 and connecting the mobile phone 401 with the display panel 701 when the mobile phone 401 is inserted into the acceptance space.

The housing 111 of "U" shape includes a outer pipe unit 112a having an end coupled to front area of driving seat of the vehicle 11 and the other end disposed toward a rear area of the vehicle 11, and an inner pipe unit 112b having an end coupled to the outer pipe unit 112a so as to perform relative motion and the other end disposed toward rear area of inside the vehicle 11.

The object lens system including at least a convex lens is formed on outer end part of the outer pipe unit 112a, and the eye lens system including at least a convex lens is formed on a free end portion of the inner pipe unit 112b so as to form the afocal optical system with the object lens system.

As shown in FIG. 2, an optical transmission member 113 including the object lens unit 114, upper reflecting unit 115, and the lower reflecting unit 117 is accepted inside the outer pipe unit 112a, and the eye lens 121 includes a convex lens of larger than that of the object lens unit 114 so that the contracted image by the object lens unit 114 is able to be enlarged.

As shown in FIG. 3, the optical transmission member 113 includes the object lens unit 114 formed as a convex lens for refracting the ray so that an image of object is able to be contracted, and the upper reflecting unit 115 and lower reflecting unit 117 arranged at a certain angle against an optical axial line of the object lens unit 114 within the focal length of the object lens unit 114 and arranged to make a right-angle with inner angles so that the reciprocal contact line corresponds to the horizontal center line of the object lens unit 114.

In rear area of the optical transmission member 113, that is, outside of the focal length of the object lens unit 114, a fixed reflecting mirror unit 201 having a planar reflection surface so that the ray reflected by the upper and lower reflecting units 115 and 117 is able to be reflected to the eye lens 121, and a movable reflecting mirror unit 251 is disposed to be rotational on upper part of the fixed reflecting mirror unit 201.

A movable reflecting mirror driving unit 251 is disposed on a rotation axis 255 formed on one side of the movable reflecting mirror unit 251 in a vertical direction so that the movable reflecting mirror unit 251 is rotated between a reflecting position, disposed at a certain angle with the optical axial line, on which the ray transmitted the optical transmission member 113 is reflected to the eye lens 121 and a retracting position disposed parallel with the passage of the ray and the passage is blocked.

On the other hand, the inner pipe unit 112b of reversed "L" shape is formed to be enlarged the width toward the end part on which the eye lens 121 is installed. A perspective window 161 is formed on an area disposed in width direction of progressing direction of the vehicle 11 so that the ray from outside is able to be transmitted inside, and the perspective window 161 is formed corresponding to the movable reflecting mirror unit 251 so as to be opened/closed by the movable reflecting mirror unit 251.

Herein, the perspective window 161 is made by covering an opened hole formed on the inner pipe unit 112b with a transparent rigid member such as a transparent blocking film, glass, or a transparent acryl, whereby the ray is able to be transmitted and foreign materials can not be flowed in.

A display panel 701 is coupled outer part of the perspective window 161 so that a display surface can be viewed through the eye lens 121 when the movable reflecting mirror unit 251 is on the retracting position. Lightings 163 are disposed on upper and lower peripheral portions of the perspective window 161 for lighting the display panel 701. Herein, the lightings 163 can be adhered to the display panel 701.

In the practice of the invention, the display panel 701 may have a electronic module in order to directly connect a wireless sensor located in a vehicle, such as wireless tire condition monitoring apparatus including transmitter and receiver. According to the above structure, information received from the wireless tire condition monitoring apparatus could be displayed on the display panel 701. In the preferred embodiment of the invention, the display panel 701 may be also directly connected to the mobile phone and also wirelessly connected to the terminal holder.

Inside the terminal holder 501, an acceptance space S is formed so that lower part of a mobile phone 401 is able to be inserted, and a speaker phone 516 and a microphone 518 are disposed on the front part of the terminal holder 501 so as to operate the mobile phone 401 with hands-free. Between the speaker phone 516 and the microphone 518, a volume controlling member 519 for controlling the volume is installed.

An antenna coupling unit 521 is formed on one peripheral portion of the terminal holder 501 so that a plug 532 of outer antenna installed outside of the vehicle 11. A keyboard connecting unit 523 is disposed on lower part of the antenna coupling unit 521 so as to be connected to a keyboard 533 having a plurality of controlling keys 534 so as to correspond to controlling keys 403 of the mobile phone 401. An electric cord connecting unit 525 is disposed on lower part of the keyboard connecting unit 523 so that one end of an electric cord 535 whose the other end is connected to a cigar lighter jack of the vehicle 11 is able to be connected therein.

A board assembly (not shown) constructed by a plurality of circuits and semiconductor components is included inside the terminal holder 501 so that if the mobile phone 401 is inserted into the acceptance space S of the terminal holder 501, the user is able to user the mobile phone 401 freely.

Figure 4:
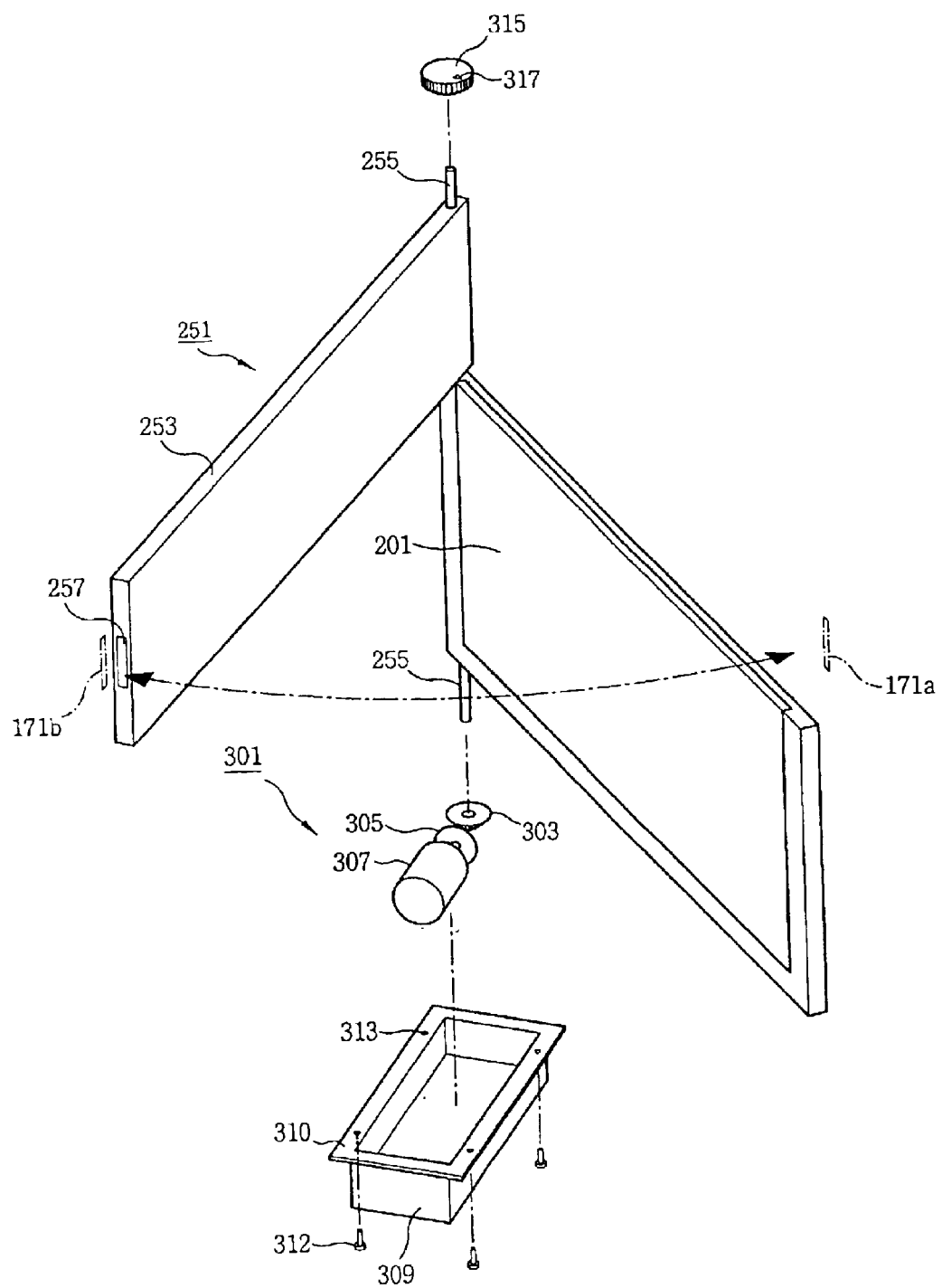
FIG. 4 is an enlarged exploded perspective view showing a movable reflecting mirror driving unit of the fusion monitor system for vehicles in FIG. 1.
Figure 5:
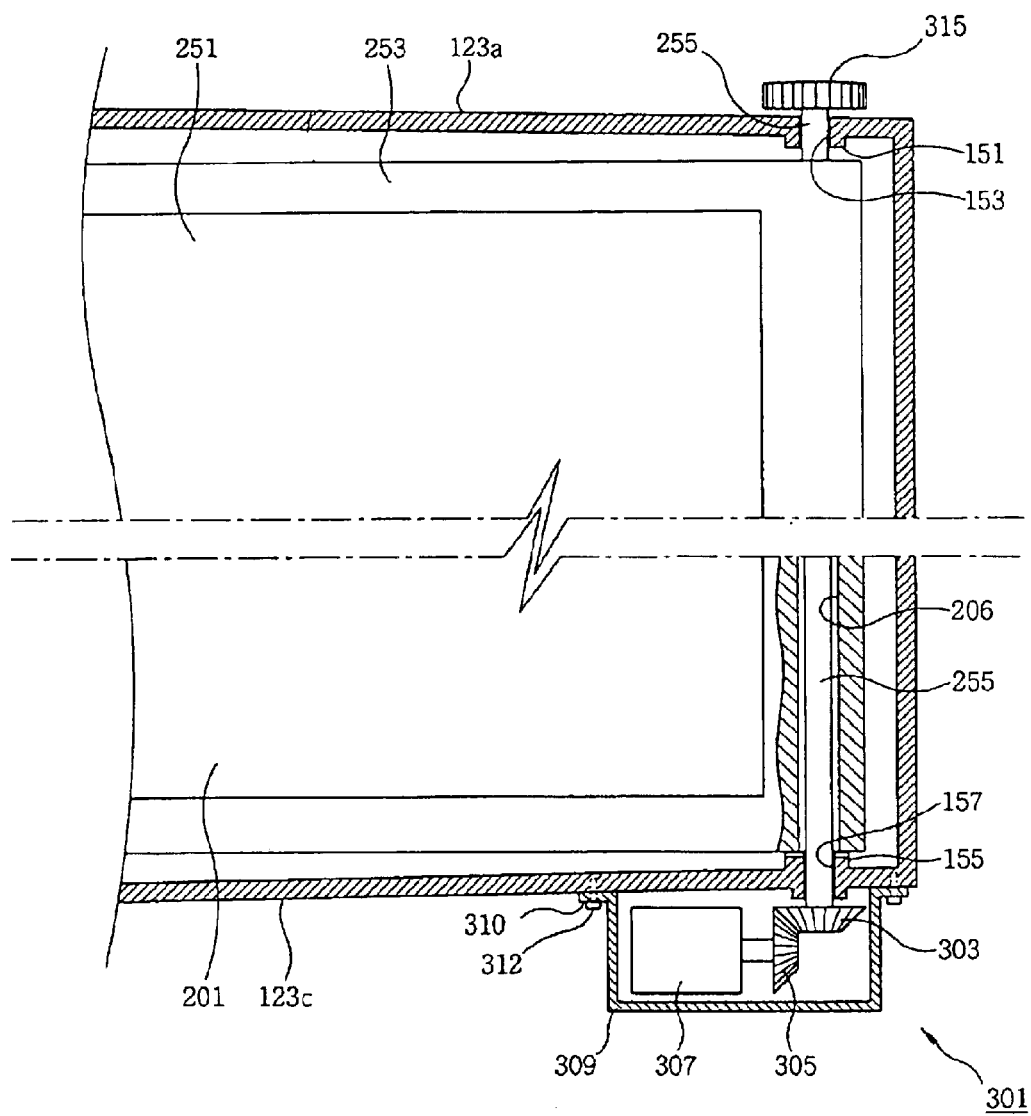
FIG. 5 is an enlarged cross-sectional view showing line V—V in FIG. 1.
Figure 6A:
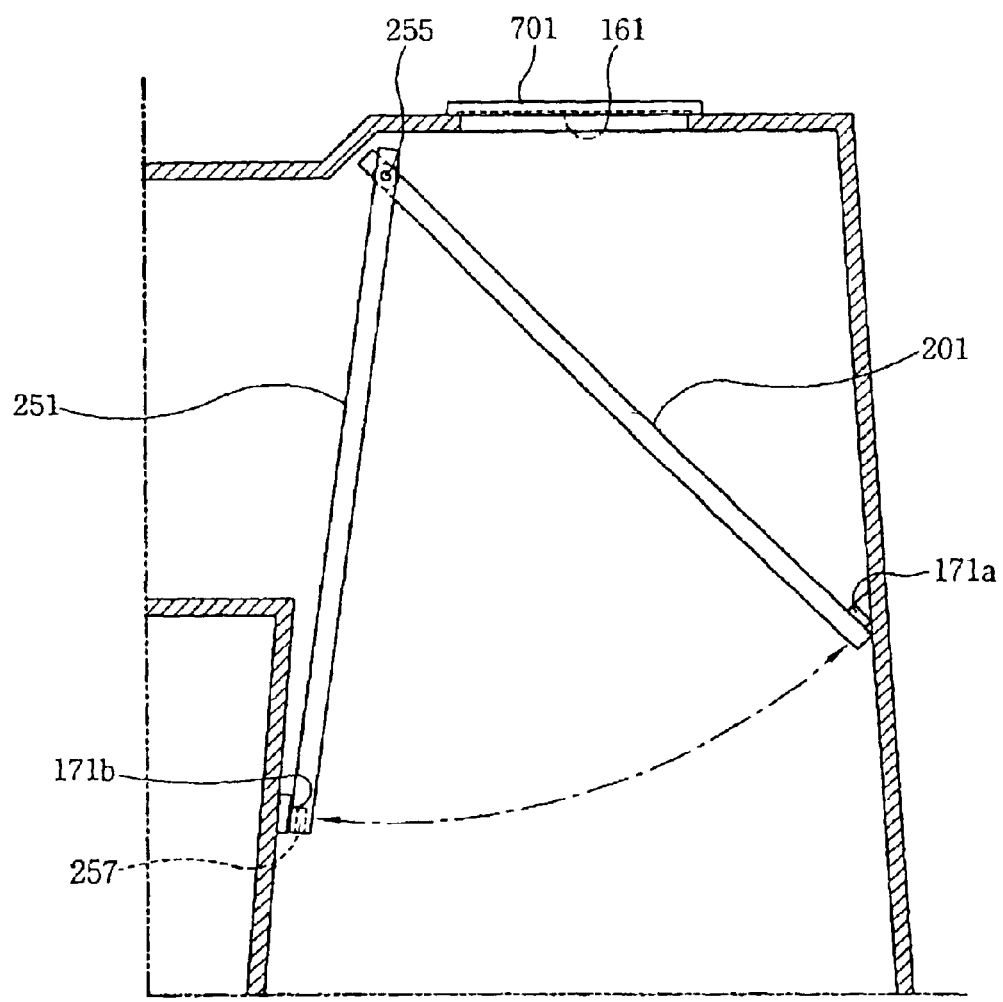
FIGS. 6A and 6B are plan cross-sectional views for describing an operating state of the movable reflecting mirror unit in FIG. 4.
Figure 6B:
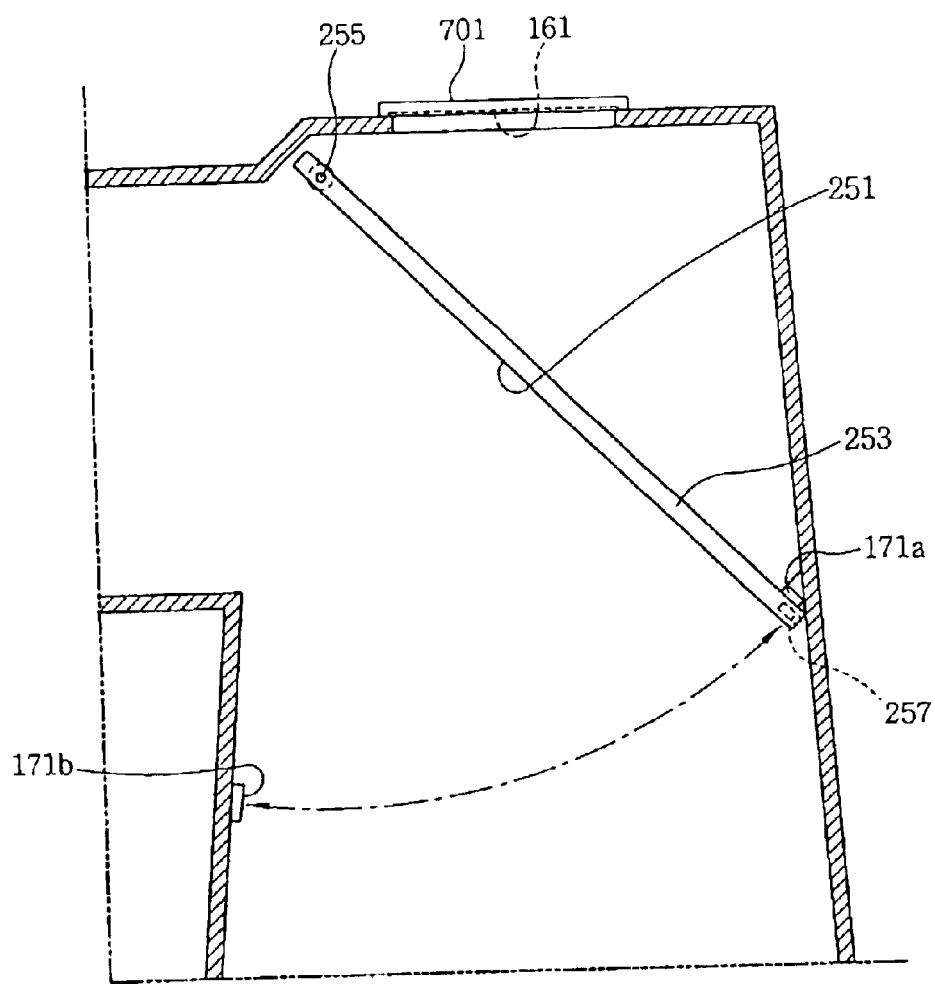

FIG. 4 is an enlarged exploded perspective view showing the movable reflecting mirror driving unit of the fusion monitor system for vehicles in FIG. 1, FIG. 5 is an enlarged cross-sectional view showing line V—V in FIG. 1, and FIGS. 6A and 6B are plan cross-sectional views for describing operating state of the movable reflecting mirror unit in FIG. 4. As shown therein, a casing 253 of nearly square shape is formed on boundary part of the movable reflecting mirror unit 251, and a rotating axis 255 protruded in vertical direction is formed on one side of the casing 253 along with the length direction.

The lower end part of the rotating axis 255 is penetrating an axial hole 206 formed on one peripheral portion of the fixed reflecting mirror unit 201 and bottom surface 123c of the inner pipe unit 112b, and extended downward so as to be exposed outside. A permanent magnet 257 of plate shape is laid inside corresponding part of the rotating axis 255 of the casing 253, magnetic members 171a and 171b are disposed inside the inner pipe unit 112b so that the movable reflecting mirror unit 251 is fixed on the reflecting position or on the retracting position by magnetically contacting to the permanent magnet 257.

An upper rotating axis accepting unit 151 and a lower rotating axis accepting unit 155 are formed on the inner pipe unit 112b so as to support the rotating axis 255 to be rotatable, and axis accepting holes 153 and 157 are formed on respective rotating axis accepting units 151 and 155 so that respective ends of the rotating axis 255 penetrate upper surface 123a and bottom surface 123c and protrude out of the inner pipe unit 112b.

On the other hand, the movable reflecting mirror driving unit 301 is disposed on the inner pipe unit 112b in order to rotate the movable reflecting mirror unit 251 between the reflecting position and the retracting position by manual operation or switching operation.

The movable reflecting mirror driving unit 301 includes a driven gear 303 coupled to lower end part of the rotating axis 255 to be rotatable as a single body, a driving gear 305 rotating with the driven gear 303 by meshing with each other, and a driving motor 307 coupled to the driving gear 305 so as to rotate the gear 305 reciprocally.

The driven gear 303 and the driving gear 305 are formed as a bevel gear in which rotating axes of respective gears are arranged as right-angled with each other, whereby the gears 303 and 305 are able to be rotated as a single body. Lower end of the rotating axis 255 is protruded on the bottom surface 123c of the inner pipe unit 112b, and the driven gear 303, driving gear 305, and the driving motor 307 are coupled to an exposed end part of the rotating axis 255.

A driving unit housing 309 of a rectangular shape with an end is opened is coupled to the boundary part of above, and a contact flange 310 contacted to the bottom surface 123c of the inner pipe unit 112b is flanged and extended from the opened peripheral portion of the driving unit housing 309. On the contact flange 310, a plurality of screw holes 313 are formed so that a plurality of screws 312 can be coupled. A plurality of screw coupling holes (not shown) which are communicated with the screw holes 313 are formed on the inner pipe unit 112b.

An upper end of the rotating axis 255 is installed on upper surface 123a of the inner pipe unit 112b so as to be protruded, a manual controlling handle 315 is coupled rotatably to the exposed end part of the rotating axis 255 so as to the rotating axis 255 is reciprocally rotated with hands. A marking unit 317 is formed on the manual controlling handle 315 in order to recognize the position of the movable reflecting mirror unit 251.

In order to rotate the movable reflecting mirror unit 251 on the reflecting position to the retracting position by manual controlling, the user rotates the manual controlling handle 315 coupled on the upper surface of the inner pipe unit 112b to corresponding position. Then, the casing 253 which is fixed by the magnetic force is separated from the magnetic member 171a and rotated centering around the rotating axis 255, and then fixed on the retracting position by magnetically contacting to the magnetic member 171b installed on the retracting position.

On the other hand, in order to control the position of the movable reflecting mirror unit 251 by switch controlling, the power is applied to the driving motor 307 by controlling a reflecting mirror position controlling switch (not shown), and then the driving force of the driving motor 307 is transmitted to the rotating axis 255 through the driving gear 305 and the driven gear 303 which are meshed with each other, whereby the rotating axis 255 is rotated.

Accordingly, the casing 253 fixed by contacting to the magnetic member 171a by the magnetic force of the permanent magnet 257 is separated from the magnetic member 171a formed on the reflecting position and rotated centering around the rotating axis 255. The permanent magnet 257 formed on the casing 253 and the magnetic member 171b formed on the retracting position are magnetically contacted with each other, whereby the movable reflecting mirror unit 251 is fixed on the retracting position where the perspective window 161 is opened.

Figure 7:
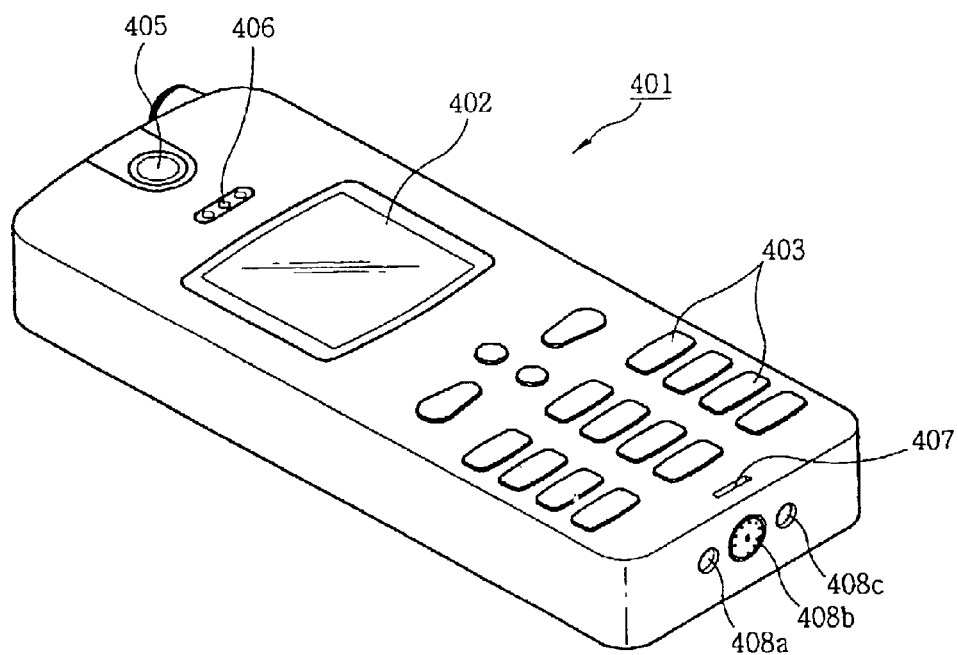
FIG. 7 is an enlarged perspective view showing a mobile phone in FIG. 1.

FIG. 7 is an enlarged perspective view showing the mobile phone in FIG. 1. As shown therein, the mobile phone 401 includes a display window 402 and a plurality of controlling keys 403. On upper area of the display window 402 along with the length direction, a motion image camera 405 and an earphone 406 are installed, and a voice transmitter 407 is installed on lower area of the controlling keys 403.

An antenna connecting unit 408a, a cable pin connecting unit 408b, and power connecting unit 408c are formed on lower end part of the mobile phone 401 so as to be connected to an outer antenna connecting plug 546a, to a communication cable connecting pin 546b, and to power source plug 546c, which will be described later, respectively.

Figure 8:
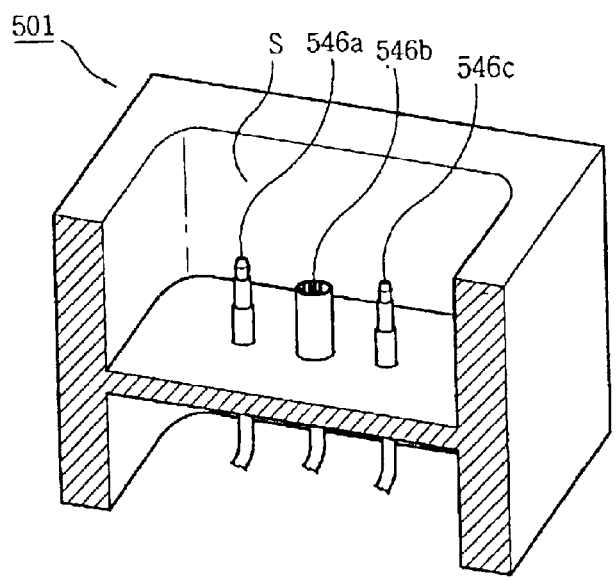
FIG. 8 is a cut perspective view showing a terminal holder in FIG. 1.
Figure 9:
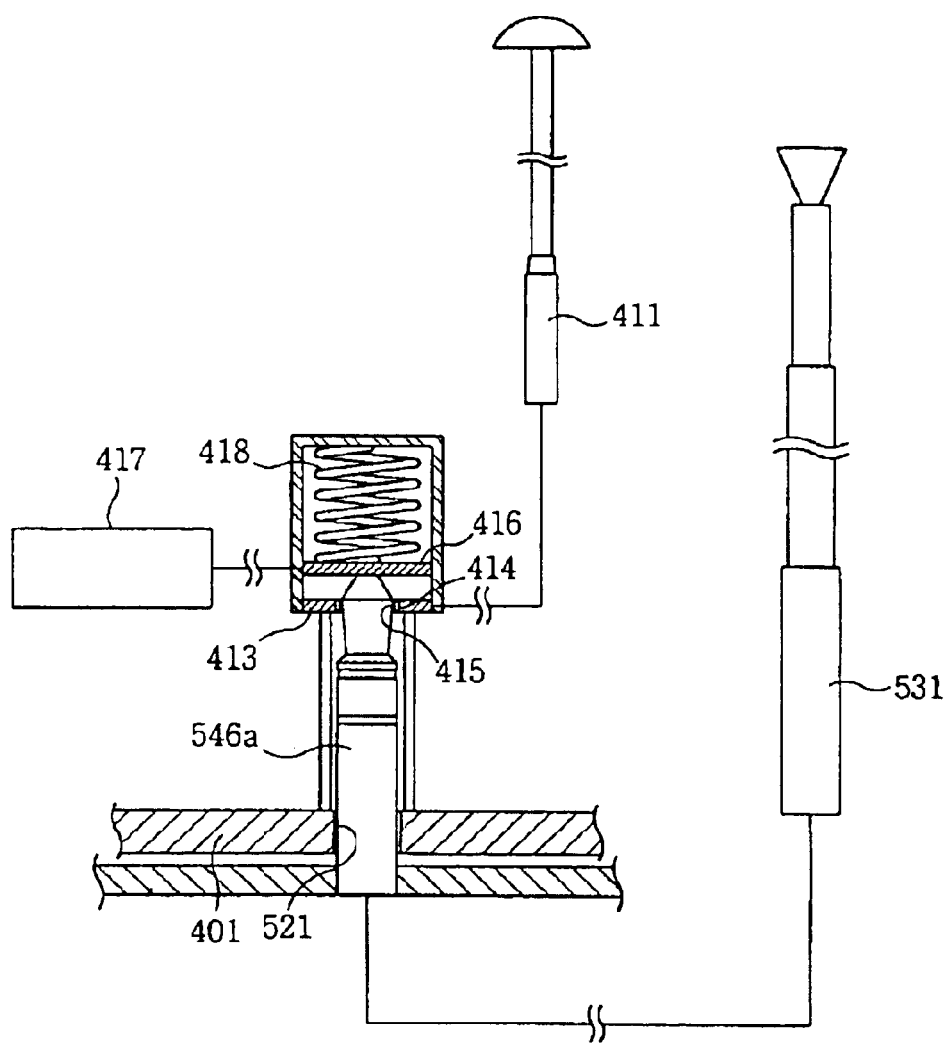
FIG. 9 is a drawing showing an antenna contact area when a mobile phone is accepted inside the terminal holder in FIG. 1.

FIG. 8 is a cut perspective view showing the terminal holder in FIG. 1, and FIG. 9 is a drawing showing the antenna connecting unit when the mobile phone is inserted into the terminal holder. As shown therein, on bottom area of the mobile phone accepting space S formed inside the terminal holder 501, the outer antenna connecting plug 546a, the communication cable connecting pin 546b, and the power source plug 546c are formed so that these are able to be inserted into the antenna connecting unit 408a, the cable pin connecting unit 408b, and the power connecting unit 408c formed on bottom surface of the mobile phone 401.

The outer antenna connecting plug 546a is connected electrically with the antenna coupling unit 521 formed on one side of the terminal holder 501, and the power source plug 546c is connected to the electric cord connecting unit 525 formed on one side of the terminal holder 501 and provides the power source from outside to the mobile phone 401.

On the other hand, the communication cable connecting pin 546b is electrically connected to the keyboard connecting unit 523 and to the display panel 701, and therefore it transmits signals from the keyboard 533 inputted through the keyboard connecting unit 523 to the mobile phone 401 and makes the same information as that displayed on the display window 402 of the mobile phone 401 be displayed at the same time on the display panel 701. Also, the communication cable connecting pin 546b is connected to the speaker phone 516 and to the microphone 518 electrically, transmits voice information inputted through the microphone 518 to the mobile phone 401, and makes the voice information of the mobile phone 401 be outputted through the speaker phone 516.

On the other hand, a fixed terminal 413 of a disk shape electrically connected to a built-in antenna 411 included in the mobile phone 401 is installed on end part of the antenna coupling unit 521 of the mobile phone 401, and a plug passage hole 414 is formed on center area of the fixed terminal 413 so that the outer antenna connecting plug 546a can be passed.

An insulating layer 415 is formed on one peripheral portion of the plug passage hole 414 so as to insulate the outer antenna connecting plug 546a connected to the outer antenna 531. A movable terminal 416 connected to a radio transmitting/receiving circuit 417 is installed on one side of the rear area of the fixed terminal 413 against inserting direction of the outer antenna connecting plug 546a so as to be contacted/separated to/from the fixed terminal 413. A spring member 418 for elastically pressing the movable terminal 416 in order to contact the movable terminal 416 to the fixed terminal 413 is installed on one side of the movable terminal 416.

According to the above structure, when the mobile phone 401 is inserted into the terminal holder 501, the outer antenna connecting plug 546a protrusively formed on the bottom of the accepting space S is coupled to the antenna connecting unit 408a. In addition, when the front end of the outer antenna connecting plug 546a passes through the plug passage hole 414 of the fixed terminal 413 and contacts to the plate surface of the movable terminal 416, the spring member 418 elastically contacted to one side of the movable terminal 416 is contracted and the movable terminal 416 is separated from the fixed terminal 413.

Accordingly, the connect between the radio transmitting/receiving circuit 417 and the built-in antenna 411 is broken, and at the same time, the radio transmitting/receiving circuit 417 is electrically connected to the outer antenna 531, whereby problems of respective devices caused by electromagnetic radiation which may be generated from the mobile phone 401 such as a sudden acceleration or sudden departure of an engine or an air bag, and bad effects which may be caused by the electromagnetic radiation, can be prevented.

Figure 10:
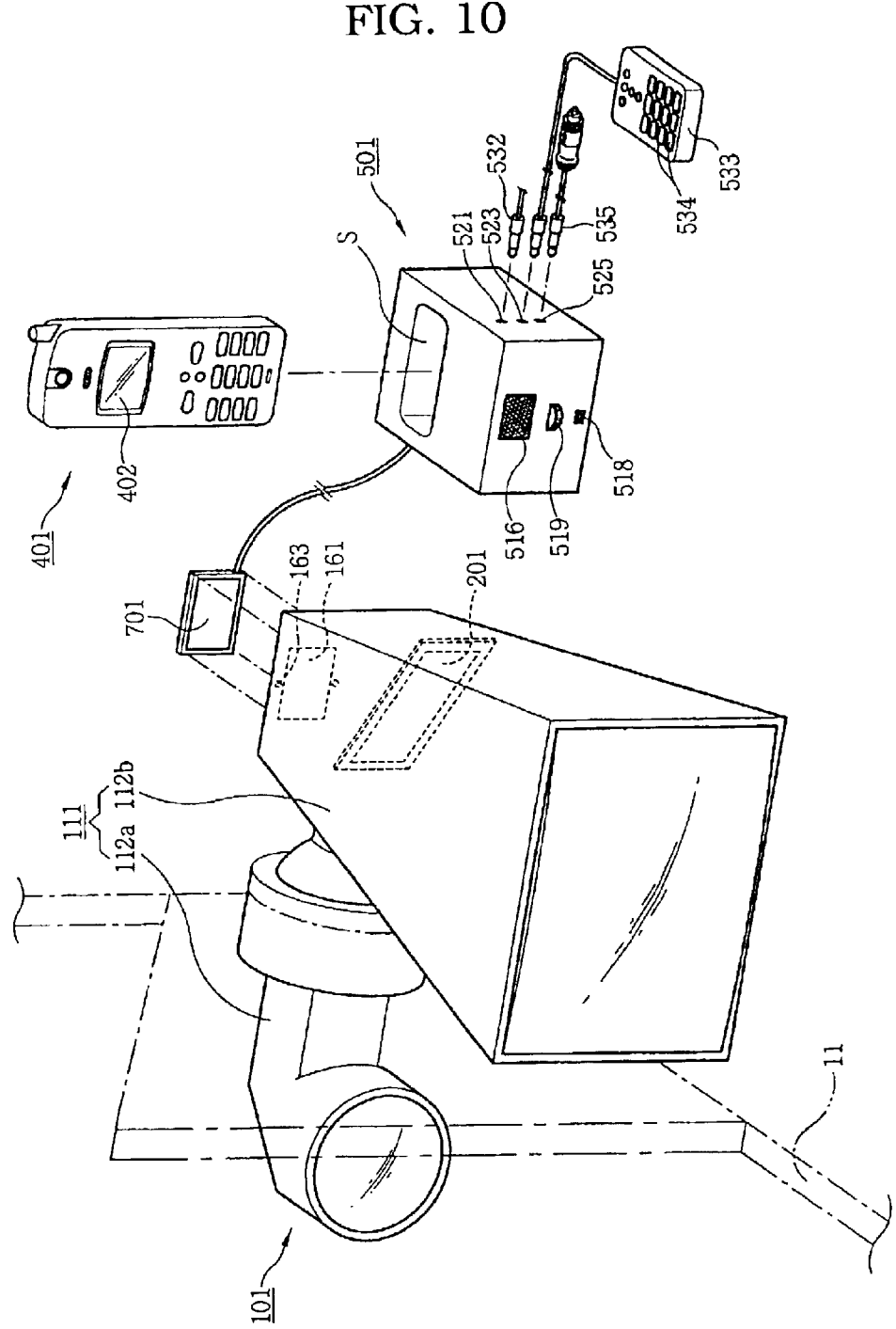
FIG. 10 is an exploded perspective view showing the fusion monitor system for vehicles according to a second embodiment of the present invention.
Figure 11:
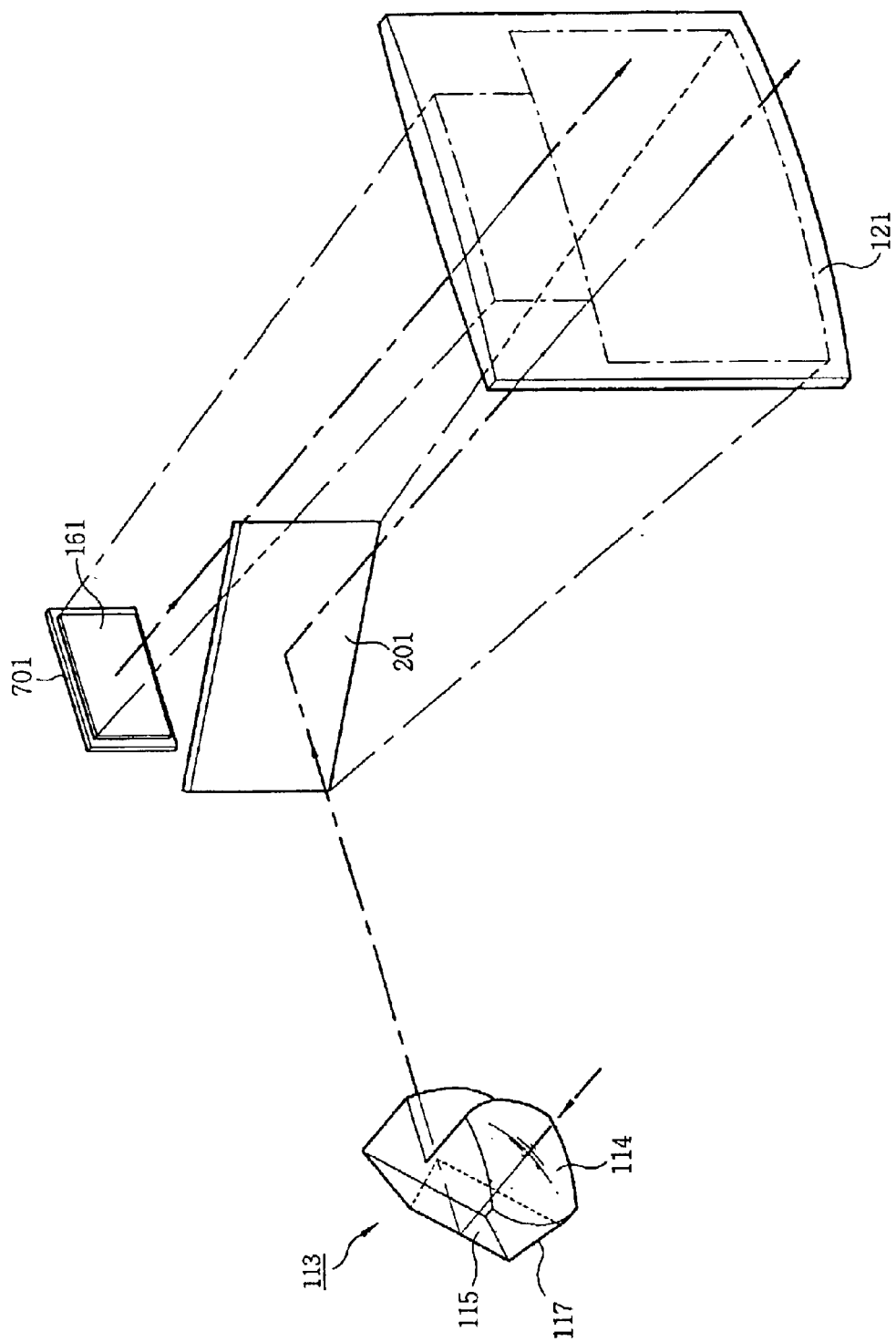
FIG. 11 is a perspective view showing a structure of the sideview mirror unit in FIG. 10.

FIG. 10 is an exploded perspective view showing a fusion monitor system for vehicles according to the second embodiment of the present invention, and FIG. 11 is a perspective view showing a rough structure of the sideview mirror unit in FIG. 10. The same components as those of the previous embodiment are designated by the same reference numerals, and detailed descriptions for those are omitted. As shown therein, the fusion monitor system according to the present embodiment comprises; a sideview mirror unit 101 including a housing 111 having one end disposed out of the vehicle 11 and other end disposed inside of the vehicle 11, an object lens system 114 and an eye lens 121 arranged on end parts of outside/inside of the housing 111 respectively for forming an afocal optical system, and a fixed reflecting mirror unit 201 disposed between the object lens system 114 and the eye lens 121 for reflecting a ray passed the object lens system 114 to the eye lens 121; a display panel 701 coupled to a perspective window 161 formed on a wall of housing 11 inside the vehicle 11 and outputting the same information as that displayed on a display window 402 of the mobile phone 401; and a terminal holder 501 having an acceptance space for accepting a part of the mobile phone 401 and having a function for connecting the mobile phone 401 with the display panel 701 when the mobile phone 401 is accepted.

Herein, the perspective window 161 is formed to be disposed on upper part of the fixed reflecting mirror unit 201 when facade projected. The eye lens 121 is formed to have a vertical width through which a user is able to view the fixed reflecting mirror unit 201 and the perspective window 161 at the same time.

Also, a magnification controlling lens (not shown) may be installed between the eye lens 121 and the perspective window 161 so as to control the magnification of display surface of the display panel 701. An additional optical lens for compensating distortion (not shown) may be installed between the eye lens 121 and the perspective window 161 for compensating a distortion may be generated on display surface of the display panel 701 by the eye lens 121.

According to above structure, an image in the rear area of the vehicle 11 is contracted by the object lens system 114, is reflected by the upper reflecting unit 115 and the lower reflecting unit 117, and after that, is reflected again by the fixed reflecting mirror unit 201 and enlarged by the eye lens 121. On the other hand, information on the display window 402 of the mobile phone 401 is displayed on the display panel 701 at the same time, and the information displayed on the display panel 701 is enlarged on the upper part of the eye lens 121 through the eye lens 121, whereby the information and the image can be viewed at the same time.

In the practice of the invention, the display panel 701 may have a electronic module in order to directly connect a wireless sensor located in a vehicle, such as a wireless tire condition monitoring apparatus including transmitter and receiver. According to the above structure, information received from the wireless tire condition monitoring apparatus could be displayed on the display panel 701. In the preferred embodiment of the invention, the display panel 701 may also be wirelessly connected to the terminal holder.

Figure 12:
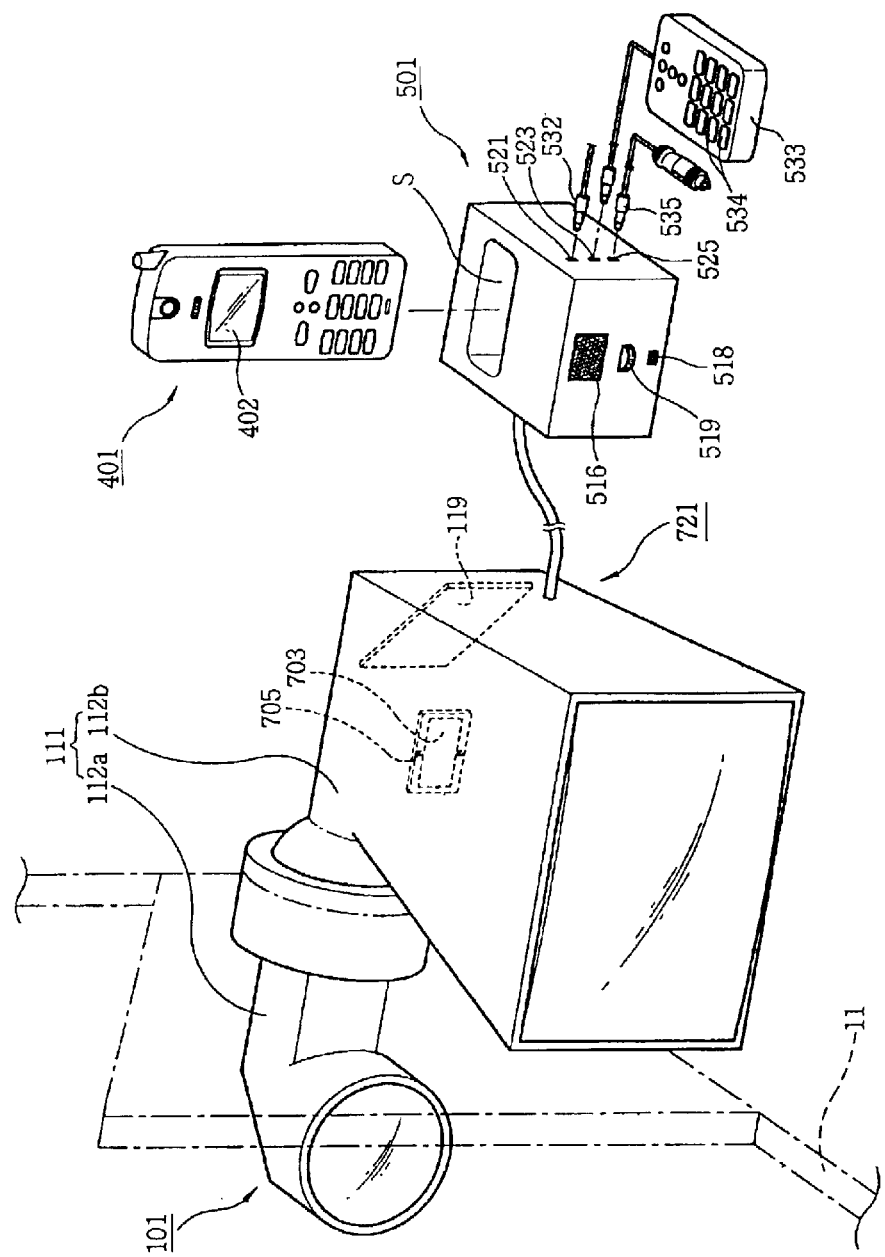
FIG. 12 is a perspective view showing a fusion monitor system according to a third embodiment of the present invention.
Figure 13:
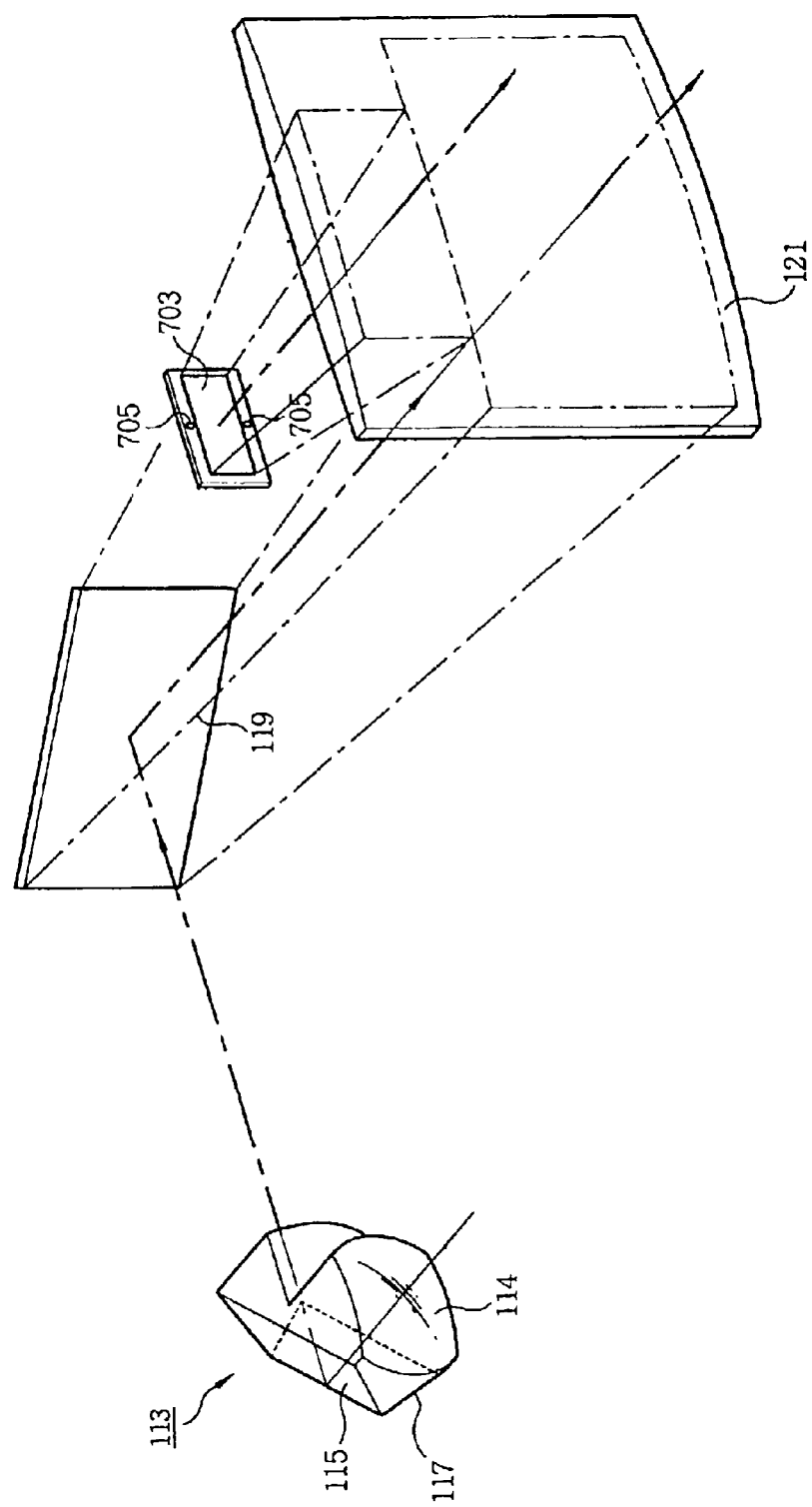
FIG. 13 is a drawing showing a rough structure of the sideview mirror unit in FIG. 12.

FIG. 12 is a perspective view showing a fusion monitor system for vehicles according to the third embodiment of the present invention, and FIG. 13 is a drawing showing a rough structure of the sideview mirror unit in FIG. 12. The same components as those of the previous embodiment are designated by the same reference numerals, and detailed descriptions for those are omitted. As shown therein, the fusion monitor system for vehicles according to the present embodiment comprises: a sideview mirror unit 101 including a housing 111 having one end disposed out of the vehicle 11 and other end disposed inside of the vehicle 11, an object lens system 114 and an eye lens 121 arranged on end parts of outside/inside of the housing 111 respectively for forming an afocal optical system, and a third reflecting unit 119 disposed between the object lens system 114 and the eye lens 121 for reflecting a ray reflected by the upper and lower reflecting units 115 and 117 after passing the object lens system 114 to the eye lens 121; and a display panel 703 disposed between the third reflecting unit 119 and the eye lens 121, and outputting same information as that displayed on the display window 402 of the mobile phone 401.

Herein, the third reflecting unit 119 is formed as a planar reflecting mirror having a planar reflecting surface, and is disposed on the rear area of the optical transmission member 113, that is, out of the focal length of the object lens unit 114 at a certain angle against the ray passage so that the ray reflected by the upper and lower reflecting units 115 and 117 is reflected to the eye lens 121.

On the other hand, inside the inner pipe unit 112b, the display panel 703 is disposed between the third reflecting unit 119 and the eye lens 121 along with the ray passage when facade projection in vertical direction of the inner pipe unit 112b. In addition, lightings 705 are installed on peripheral portions of upper and lower parts of the display panel 703.

The inner pipe unit 112b and the eye lens 121 are formed to have a vertical length through which an image in the rear area of the vehicle 11 reflected by the third reflecting unit 119 after passing the optical transmission member 113 and an enlarged image on the display panel 703 can be viewed at the same time.

Herein, at least one magnification controlling lens (not shown) may be installed between the eye lens 121 and the display panel 703 so as to control the magnification of the display surface of the display panel 703.

Also, an additional optical lens for compensating distortion (not shown) may be installed between the eye lens 121 and the display panel 703 for compensating a distortion may be generated on display surface of the display panel 703 by the eye lens 121.

According to the above structure, the information display on the display window 402 of the mobile phone 401 is displayed on the display panel 703 at the same time, and the information displayed on the display panel 703 is enlarged by the eye lens 121, whereby the image in the rear area of the vehicle 11 and the information can be viewed at the same time.

In the practice of the invention, the display panel 701 may have an electronic module in order to directly connect a wireless sensor located in a vehicle, such as a wireless tire condition monitoring apparatus including transmitter and receiver. According to the above structure, information received from the wireless tire condition monitoring apparatus could be displayed on the display panel 701. In the preferred embodiment of the invention, the display panel 701 may be also wirelessly connected to the terminal holder.

Figure 14:
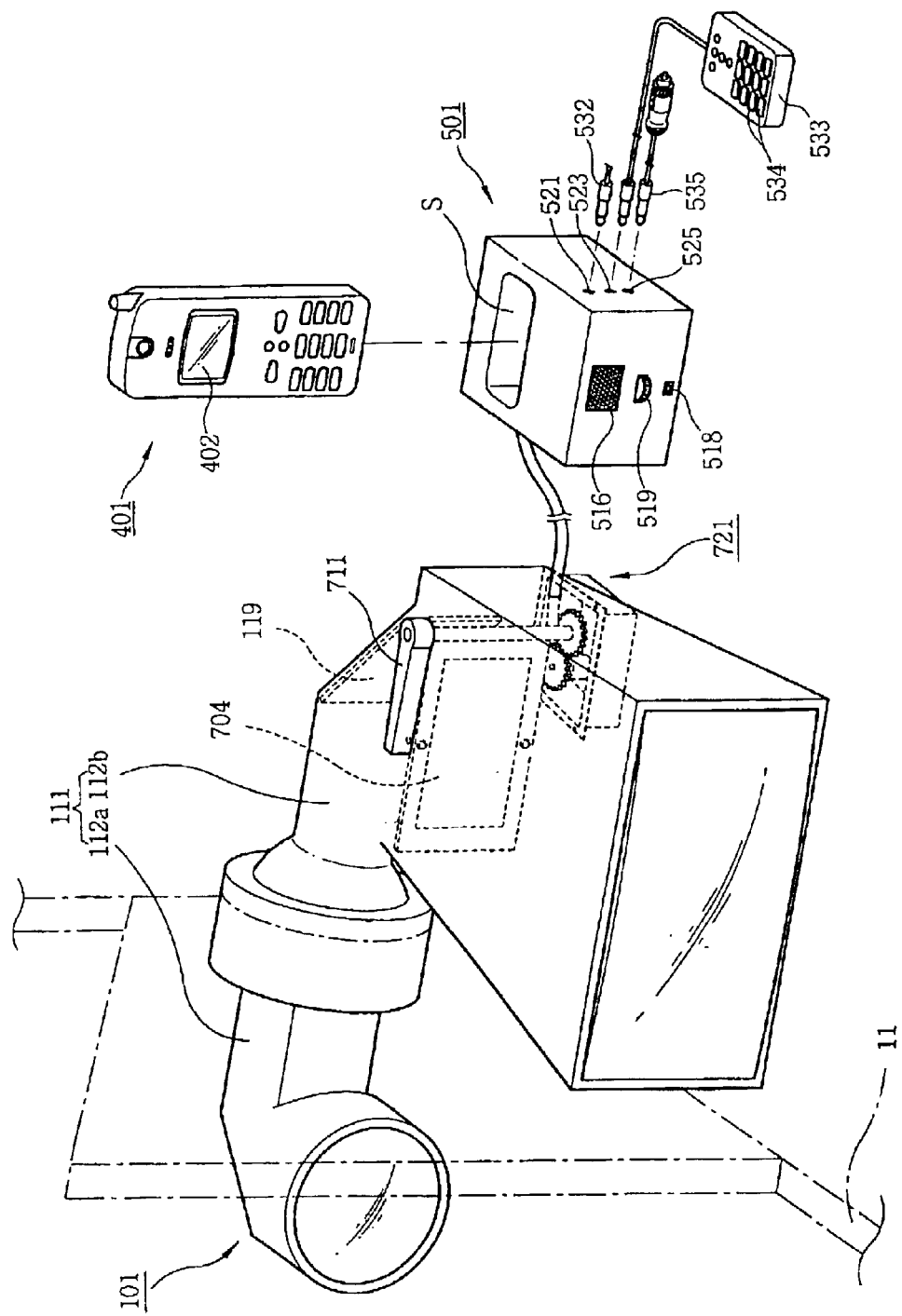
FIG. 14 is an exploded perspective view showing a fusion monitor system for vehicles according to a fourth embodiment of the present invention.
Figure 15:
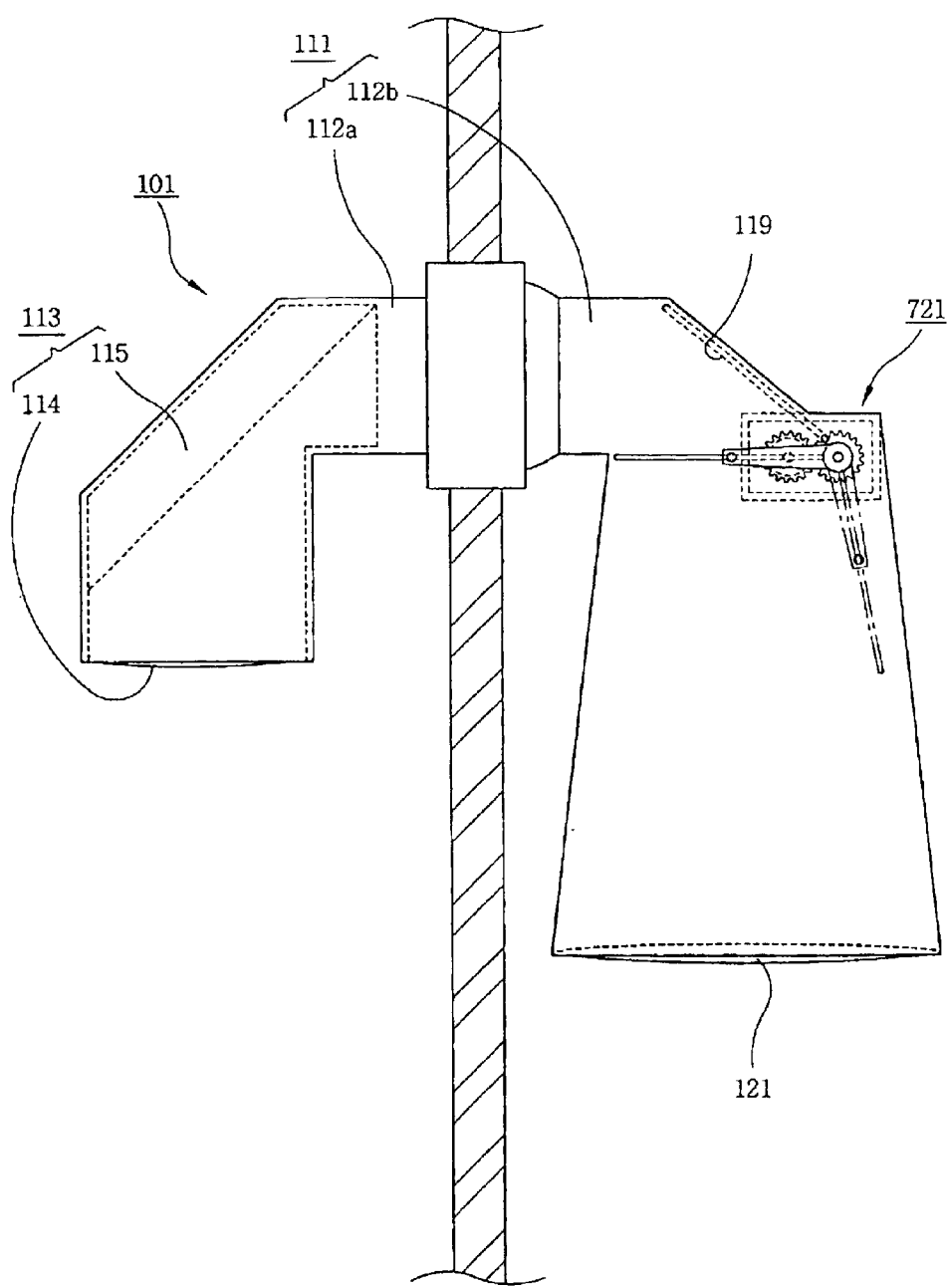
FIG. 15 is a plan cross-sectional view showing the fusion monitor system for vehicles in FIG. 14.
Figure 16:
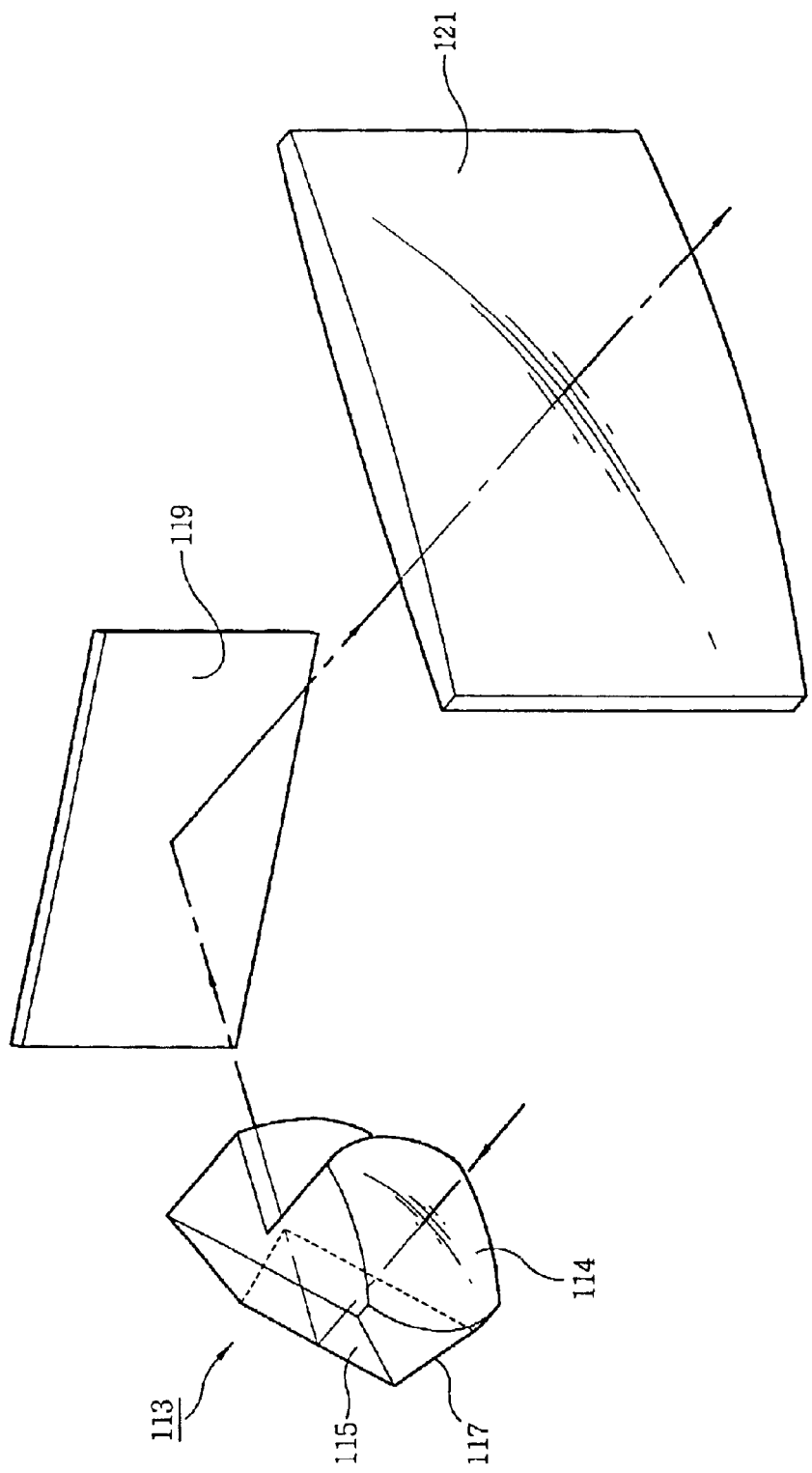
FIG. 16 is a perspective view showing a rough structure of the sideview mirror unit in FIG. 14.

FIG. 14 is an exploded perspective view showing a fusion monitor system for vehicles according to the fourth embodiment of the present invention, FIG. 15 is a cross-sectional view showing the fusion monitor system in FIG. 14, and FIG. 16 is a perspective view showing a rough structure of the sideview mirror unit in FIG. 14. The same components as those of the previous embodiment are designated by the same reference numerals, and detailed descriptions for those are omitted. As shown therein, the fusion monitor system according to the present embodiment comprises: a sideview mirror unit 101 including a housing 111 having one end disposed out of the vehicle 11 and other end disposed inside of the vehicle 11, an object lens system and an eye lens system arranged on end parts of outside/inside of the housing 111 respectively for forming an afocal optical system, and a third reflecting unit 119 disposed between the object lens system and the eye lens system for reflecting a ray reflected by the upper and lower reflecting units 115 and 117 after passing the object lens system 114 to the eye lens system; a display panel 704 disposed between the third reflecting unit 119 and the eye lens system to be rotatable, and outputting image information displayed on the display window 402 of the mobile phone 401; and a panel driving unit 721 for rotating the display panel between an output position on which the display panel 704 is disposed to block the ray passage and outputs a certain image information and a retracting position on which the display panel 704 is rotated so that the ray passage can be opened.

The housing 111 of "U" shape includes the outer pipe unit 112a having one end fixedly coupled to front area of driving seat in the vehicle 11 and the other end disposed toward rear area of the vehicle 11, and the inner pipe unit 112b having one end coupled to the outer pipe unit 112a so as to perform a relative motion and the other end disposed toward inner rear area of the vehicle 11.

On end of the outer part of the outer pipe unit 112a, the object lens system including at least a convex lens is disposed, and the eye lens system including at least a convex lens is formed on end part of the inner pipe unit 112b along with the optical axial line direction so as to form the afocal optical system with the object lens system.

As in the previously described embodiments, an optical transmission member 113 including the object lens system 114, the upper reflecting unit 115, and the lower reflecting unit 117 formed as a single body is acceptedly installed inside the outer pipe unit 112a, the eye lens 121 is made by a 24 convex lens having a size as twice as that of the object lens unit 114 so that the image contracted by the object lens unit 114.

In the practice of the invention, the display panel 701 may have a electronic module in order to directly connect a wireless sensor located in a vehicle, such as a wireless tire condition monitoring apparatus including transmitter and receiver. According to the above structure, information received from the wireless tire condition monitoring apparatus could be displayed on the display panel 701. In the preferred embodiment of the invention, the display panel 701 may be also wirelessly connected to the terminal holder.

As shown in FIG. 16, the optical transmission member 113 includes the object lens unit 114 formed as a convex lens on one end for retracting the ray so that the image of an object can be contracted, and an upper reflecting unit 115 and a lower reflecting unit 117 arranged within the focal length of the object lens unit 114 at a certain angle against the optical axial line of the object lens unit 114 so that internal angles make a right-angle and the reciprocal contact line is corresponded to the vertical center line of the object lens unit 114.

On the rear area of the optical transmission member 113, that is, outside of the focal length of the object lens unit 114, a third reflecting unit 119 is arranged to be sloped against the ray passage so that the ray reflected by the upper and lower reflecting units 115 and 117 is reflected to the eye lens 121.

The inner pipe unit 112b of reversed "L" shape is formed to be enlarged in width to upward/downward, and left/right along with the optical axial line toward the end area on which the eye lens 121 is formed, and the display panel 704 is arranged parallel with inner wall of the inner pipe unit 112b when the display panel 704 is on the retracting position.

A manual controlling handle 711 is disposed on upper surface 123a of the inner pipe unit 112b so as to control the display panel 704 with hands, and the panel driving unit 721 for rotating the display panel 704 between the output position and the retracting position by a switch control is formed on the bottom surface 123c of the inner pipe unit 112b.

On the other hand, the mobile phone 401 includes a display window 402 for outputting various information, and a plurality of controlling keys 403. An motion image camera 405 and an earphone 406 are installed on upper area in length direction of the display window 402, and a voice transmitter 407 is installed on lower area of the controlling keys 403.

An antenna connecting unit 408a, a cable pin connecting unit 408b, and power connecting unit 408c are formed on lower end part of the mobile phone 401 so as to be connected to an outer antenna connecting plug 546a, to a communication cable connecting pin 546b, and to power source plug 546c, which will be described later, respectively.

Inside the terminal holder 501, an acceptance space S is formed so that lower part of a mobile phone 401 is able to be inserted, and a speaker phone 516 and a microphone 518 are disposed on front part of the terminal holder 501 so as to operate the mobile phone 401 with hands-free. A volume controlling member 519 for controlling the volume is installed on one side of the speaker phone 516.

An antenna coupling unit 521 is formed on one side of the terminal holder 501 so as to be connected to a plug 532 of outer antenna installed outside of the vehicle 11. A keyboard connecting unit 523 is disposed on lower part of the antenna coupling unit 521 SO as to be connected to a keyboard 533 having a plurality of controlling keys 534 so as to correspond to controlling keys 403 of the mobile phone 401. An electric cord connecting unit 525 is disposed on the lower part of the keyboard connecting unit 523 so that one end of an electric cord 535 whose other end is connected to a cigar lighter jack of the vehicle 11 is able to be connected therein.

A board assembly (not shown) constructed by a plurality of circuits and semiconductor components is included inside the terminal holder 501 so that if the mobile phone 401 is inserted into the acceptance space S of the terminal holder 501, the user is able to user the mobile phone 401 freely.

Figure 17:
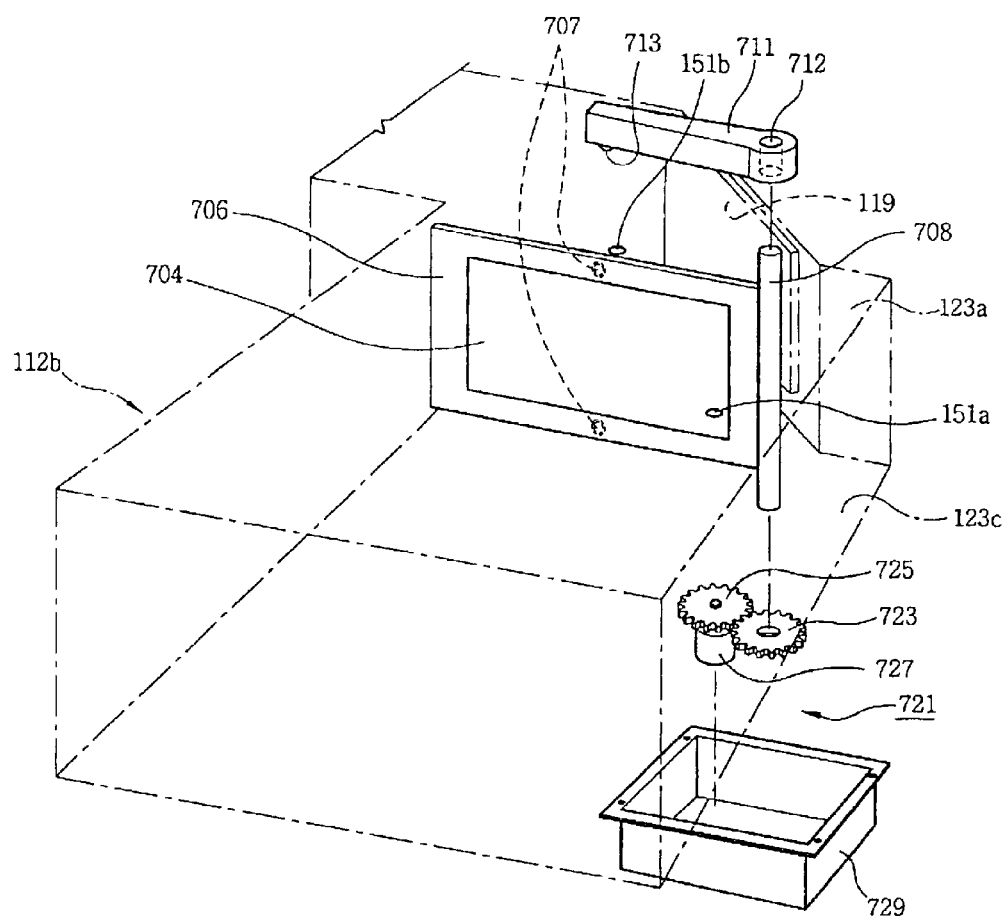
FIG. 17 is an exploded perspective view showing a display panel and panel driving unit in FIG. 14.
Figure 18:
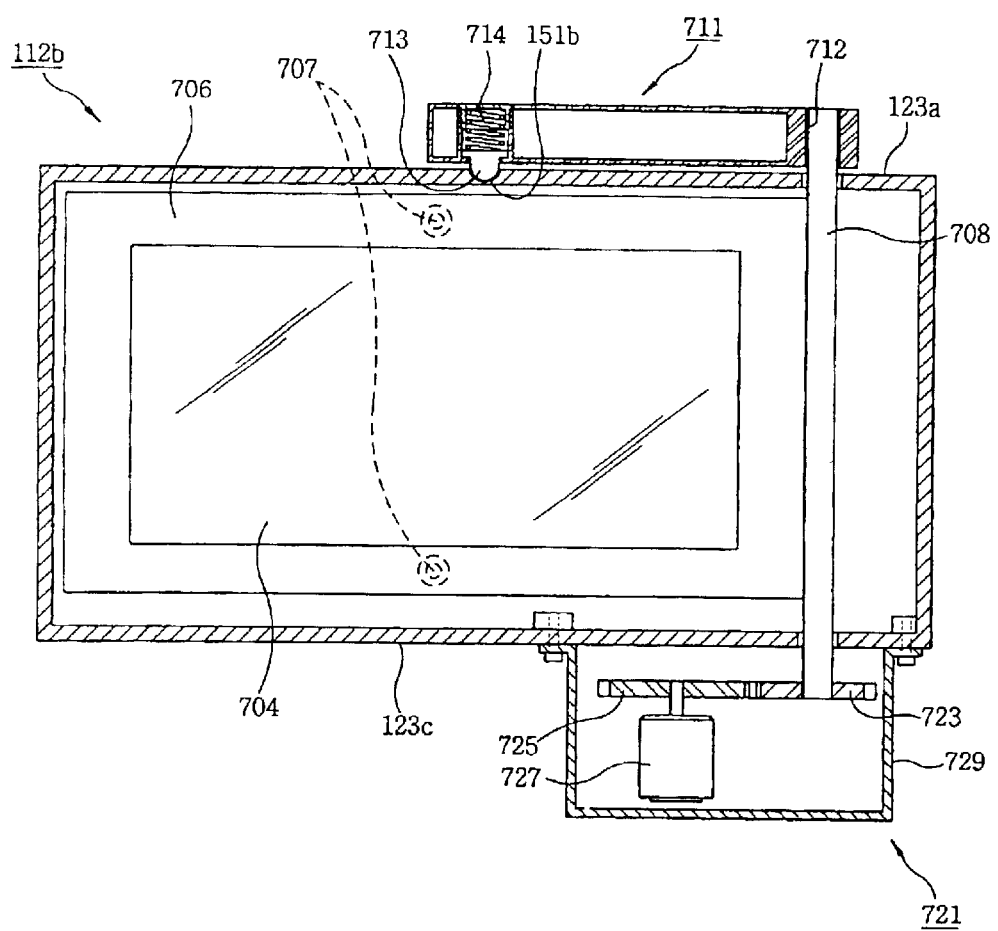
FIG. 18 is an enlarged cross-sectional view showing a coupled state in FIG. 17.

FIG. 17 is an exploded perspective view showing a rough structure of the display panel and the panel driving unit in FIG. 14, and FIG. 18 is an enlarged cross-sectional view showing the coupled state of those in FIG. 17. As shown therein, a panel supporting plate 706 for supporting the display panel 704 electrically connected to the mobile phone 401 to be located on center area of the inner pipe unit 112b is installed inside the inner-pipe unit 112b.

A rotating axis 708 is formed on one peripheral portion of the panel supporting plate 706 in vertical direction, and the panel supporting plate 706 rotates centering around the rotating axis 708 between the output position on which the display panel is arranged in width direction against the ray passage and outputs image information as blocking the ray passage, and the retracting position on which the display panel is arranged parallel with the ray passage, whereby the display panel 704 is supported. A pair of lightings 707 for lighting the display panel 704 are installed on upper and lower parts of the panel supporting plate 706 respectively.

The rotating axis 708 is formed as expanding along with the vertical direction so that the upper and lower ends are penetrating the upper surface 123a and the bottom surface 123b of the inner pipe unit 112b respectively and are exposed outside. A manual controlling handle 711 having an axis coupling hole 712 formed on one side in order to accept the rotating axis 708 is coupled to upper end part of the rotating axis 708 to be rotatable as a single body.

A position fixing protrusion 713, which is able to be protruded and retracted, is formed on opposite end part of the axis coupling hole 712 on the manual controlling handle 711, and a spring member 714 for elastically pressing the position fixing protrusion 713 so as to be protruded outside is disposed on rear area of the position fixing protrusion 713.

Protrusion accepting holes 151a and 151b depressed from the surface for fixing the manual controlling handle 711 on the output position and on the retracting position respectively are formed on the upper surface 123a of the inner pipe unit 112b.

On the other hand, the panel driving unit 721 includes a driven gear 723 coupled to lower part of the rotating axis 708 installed so as to be exposed out of the bottom surface 123c of the inner pipe unit 112b, a driving gear 725 meshed with the driven gear 723 so as to be rotated with the driven gear as a single body, and a driving motor 727 for rotating the driving gear 725. In addition, a driving unit housing 729 forming an accepting space therein is coupled to the bottom surface 123c of the inner pipe unit 112b.

According to the above structure, if a user wants to view an enlarged image of the information on the display window 402 of the mobile phone 401, the user controls a controlling switch (not shown) of the panel driving unit 721, whereby the driving motor 727 in the panel driving unit 721 is rotated. When the driving motor 727 is rotated, the rotating force of the driving motor 727 is transmitted to the rotating axis 708 by the driving gear 725 and the driven gear 723 meshed with each other.

At that time, the position fixing protrusion 713 of the manual controlling handle 711 is contacted to the peripheral portion of the protrusion accepting hole 151a, then the spring member 714 is contracted and retracted, and the position fixing protrusion 713 is rotated with the rotating axis 708 in the state of contacting to the upper surface 123a of the inner pipe unit 112b. Accordingly, the display panel 704 and the panel supporting plate 706 are rotated centering around the rotating axis 708 and arranged on the output position blocking the ray passage, and when the display panel 704 outputs the image information provided by the mobile phone 401, then the information can be viewed by enlarging through the eye lens 121.

If the user wants to move the display panel 704 to the output position by manual operation, the user holds the manual controlling handle 711 coupled to the upper surface 123a of the inner pipe unit 112b and rotates it in a clockwise direction. Then the rotating axis 708 coupled to be rotated with the manual controlling handle 711 is rotated, whereby the display panel 704 is rotated to the output position.

In the previously described embodiments, the fusion monitor system for vehicles is installed on front area of the driving seat, but it is also applied to a passenger seat.

In addition, in the previously described embodiments, the enlarged image of the display window of the mobile phone is disposed on upper part of the image in the rear area of the vehicle, however it can be displayed on the lower part, or right/left side of the image in the rear area of the vehicle by controlling the relative position of the perspective window or of the display panel.

Also, in the previously described embodiments with reference to FIG. 1 through FIG. 9, the fixed reflecting mirror unit is disposed on lower part of the movable reflecting mirror unit along with the rotating axis direction of the movable reflecting mirror unit, however it may be constructed as enlarging the movable reflecting mirror unit corresponded to the inner width of the housing and the removing the fixed reflecting mirror unit.

As so far described, according to the fusion monitor system for vehicles according to an embodiment of the present invention, the protruded length in width direction out of a vehicle is reduced and an air resistance can be reduced, information outputted on the display window of a mobile phone is able to be enlarged and thereby reading information is made easily, and a user is able to use conveniently by a hands-free device, unlike conventional sideview mirror apparatuses which cause an air resistance by being protruded of a reflecting surface.

From the foregoing it will be appreciated that, although specific embodiments of the invention have been described herein for purposes of illustration, various modifications may be made without deviating from the spirit and scope of the invention.

What is claimed is:

1. Fusion monitor system for vehicles comprising:

a sideview mirror unit including a housing of a cylindrical shape having one end disposed outside of a vehicle toward a rear side, the other end disposed inside the vehicle toward the rear side, and a perspective window formed inside the vehicle opposing an inner end part of the housing so that a ray is able to be transmitted, an object lens system disposed on an outer end part of the housing and refracting the passed ray to be converged, an upper reflecting unit and a lower reflecting unit arranged in the housing at a predetermined angle within the focal length of the object lens so that a reciprocal contact line corresponds to a horizontal center line of the object lenses and interior angles arranged to make a right-angle, a movable reflecting mirror unit having a planar reflecting surface and disposed at a certain angle beyond the focal length of the object lens system so as to open/close the perspective window, for reflecting the ray reflected from the upper reflecting unit and from the lower reflecting unit to the inner end part of the housing, and an eye lens system disposed on the inner end part of the housing for refracting the ray so that an image reflected by the movable reflecting mirror unit is enlarged whereby forming an afocal optical system with the object lens system;

a movable reflecting mirror driving unit for driving the movable reflecting mirror unit between an opening position and a reflecting position;

a terminal holder having a terminal acceptance space inside so that a part of a mobile phone is able to be accepted and disposed on one side of the housing; and a display panel having a display surface outputting same information as on a display window of the mobile phone through a data communication with the terminal holder when the mobile phone is inserted into the terminal acceptance space, and coupled to an outer part of the housing so that the display surface of the display panel faces the perspective window.

2. The fusion monitor system according to claim 1, wherein:

a rotating axis having at least one end exposed penetrating the housing is formed on one peripheral portion of the movable reflecting mirror unit; and the movable reflecting mirror driving unit includes a driven gear coupled on the exposed end of the rotating axis to be rotatable as a single body, a driving gear meshed with the driven gear so as to be rotated, and a driving motor for reciprocally rotating the driving gear.

3. The fusion monitor system according to claim 1, wherein:

a rotating axis having at least one end exposed outside the housing as penetrating the housing is formed on one peripheral portion of the movable reflecting mirror unit; and the movable reflecting mirror driving unit includes a manual controlling handle coupled to the exposed end of the rotating axis so as to be rotated as a single body.

4. The fusion monitor system according to claim 1, wherein the movable reflecting mirror unit is formed so as to have a width smaller than the inner width of the housing, and a fixed reflecting mirror unit disposed on one side of the movable reflecting mirror unit along with the plate surface of the movable reflecting mirror unit for reflecting the ray reflected from the upper and lower reflecting unit to the eye lens system.

5. The fusion monitor system according to claim 1 further comprising at least one optical lens for compensating distortion disposed between the eye lens system and the display panel for compensating a distortion generated on the display surface of the display panel viewed through the eye lens.

6. The fusion monitor system according to claim 1 further comprising at least one lighting installed for lighting the display surface of the display panel.

7. The fusion monitor system according to claim 1 further comprising at least one of voice outputting means installed on one side of the terminal holder so as to be connected electrically with the mobile phone for outputting voice information of the mobile phone, and of voice inputting means for inputting voice information from outside to the mobile phone.

8. The fusion monitor system according to claim 1, wherein a power source connecting unit is formed on the terminal holder so as to accept the other end of a power connecting cord whose one end is connected to a cigar lighter jack of the vehicle.

9. The fusion monitor system according to claim 1, wherein a keyboard having a plurality of controlling keys corresponding to controlling keys of the mobile phone, and a keyboard connecting unit is formed on a side of the terminal holder so as to connect to the mobile phone and to connect with the keyboard.

10. The fusion monitor system according to claim 1, wherein an outer antenna connecting unit is formed on one side of the terminal holder so that an outer antenna installed outside of the vehicle is connected thereto, and the outer antenna connecting unit is electrically connected to the mobile phone when the mobile phone is accepted into the mobile phone accepting space.

11. The fusion monitor system according to claim 1, the display panel (701) further having an electronic module in order to directly connect a wireless sensor located in the vehicle and/or to directly connect the mobile phone (401) so that information received from the wireless sensor and the mobile phone (401) could be displayed on the display panel (701).

12. Fusion monitor system for vehicles comprising:

a sideview mirror unit including a housing of a cylindrical shape having one end disposed outside of a vehicle toward the rear side, the other end disposed inside the vehicle toward the rear side, and a perspective window formed inside the vehicle opposing an inner end part of the housing so that a ray is able to be transmitted, an object lens system disposed on an outer end part of the housing and refracting the passed ray to be converged, an upper reflecting unit and a lower reflecting unit arranged in the housing at a predetermined angle within the focal length of the object lens so that a reciprocal contact line corresponds to a horizontal center line of the object lenses and interior angles arranged to make a right-angle, a fixed reflecting mirror unit having a planar reflecting surface disposed at a certain angle out of the focal length of the object lens system so that the perspective window can be viewed through the inner end part of the housing, and an eye lens system disposed on the inner end part of the housing for refracting the ray so that an image reflected by the fixed reflecting mirror unit is enlarged whereby forming an afocal optical system with the object lens system;

a terminal holder having a terminal acceptance space inside so that a part of a mobile phone is able to be accepted and disposed on one side of the housing; and a display panel having a display surface outputting the same information as on a display window of the mobile phone through a data communication with the terminal holder when the mobile phone is inserted into the terminal acceptance space and coupled to an outer part of the housing so that the display surface of the display panel faces the perspective window.

13. The fusion monitor system according to claim 12 further comprising at least one optical lens for compensating distortion disposed between the eye lens system and the display panel for compensating a distortion generated on the display surface of the display panel viewed through the eye lens.

14. The fusion monitor system according to claim 12 further comprising at least one lighting installed for lighting the display surface of the display panel.

15. The fusion monitor system according to claim 12 further comprising at least one of voice outputting means installed on one side of the terminal holder so as to be connected electrically with the mobile phone for outputting voice information of the mobile phone, and of voice inputting means (20) for inputting voice information from outside to the mobile phone.

16. The fusion monitor system according to claim 12, wherein a power source connecting unit is formed on the terminal holder so as to accept the other end of a power connecting cord whose one end is connected to a cigar lighter jack of the vehicle.

17. The fusion monitor system according to claim 12, wherein a keyboard having a plurality of controlling keys corresponding to controlling keys of the mobile phone, and a keyboard connecting unit is formed on one side of the terminal holder so as to connect to the mobile phone and to connect with the keyboard.

18. The fusion monitor system according to claim 12, wherein an outer antenna connecting unit is formed on one side of the terminal holder so that an outer antenna installed outside of the vehicle is connected thereto, and the outer antenna connecting unit is electrically connected to the mobile phone when the mobile phone is accepted into the mobile phone accepting space.

19. The fusion monitor system according to claim 12, the display panel (701) further having an electronic module in order to directly connect a wireless sensor located in the vehicle and/or to directly connect the mobile phone (401) so that information received from the wireless sensor and the mobile phone (401) could be displayed on the display panel (701).

20. Fusion monitor system for vehicles comprising:

A sideview mirror unit including a housing of a cylindrical shape having one end disposed outside of a vehicle toward a rear side, the other end disposed inside the vehicle toward the rear side, an object lens system disposed on an outer end part of the housing and refracting the passed ray to be converged, an upper reflecting unit and a lower reflecting unit arranged in the housing at a predetermined angle within the focal length of the object lens so that a reciprocal contact line corresponds to a horizontal center line of the object lenses and interior angles arranged to make a right-angle, a third reflecting unit disposed out of the focal length of the object lens system for reflecting the ray reflected from the upper reflecting unit and from the lower reflecting unit to an inner end part of the housing, an eye lens system disposed on the inner end part of the housing and for forming an afocal optical system with the object lens system by refracting the ray so that an image reflected by the third reflecting unit is enlarged;

a terminal holder having a terminal acceptance space inside so that a part of a mobile phone is able to be accepted and disposed on one side of the housing; and a display panel having a display surface outputting same information as on a display window of the mobile phone through a data communication with the terminal holder when the mobile phone is inserted into the terminal acceptance space, and disposed between the third reflecting unit and the eye lens system so that the image reflected on the third reflecting unit and the display surface are able to be viewed through the eye lens system at the same time.

21. The fusion monitor system according to claim 20 further comprising at least one optical lens for compensating distortion disposed between the eye lens system and the display panel for compensating a distortion generated on the display surface of the display panel viewed through the eye lens.

22. The fusion monitor system according to claim 20 further comprising at least one lighting installed for lighting the display surface of the display panel.

23. The fusion monitor system according to claim 20 further comprising at least one of voice outputting means installed on one side of the terminal holder so as to be connected electrically with the mobile phone for outputting voice information of the mobile phone, and of voice inputting means for inputting voice information from outside to the mobile phone.

24. The fusion monitor system according to claim 20, wherein a power source connecting unit is formed on the terminal holder so as to accept the other end of a power connecting cord whose one end is connected to cigar lighter jack of the vehicle.

25. The fusion monitor system according to claim 20, wherein a keyboard having a plurality of controlling keys corresponding to controlling keys of the mobile phone, and a keyboard connecting unit is formed on one side of the terminal holder so as to connect to the mobile phone and to connect with the keyboard.

26. The fusion monitor system according to claim 20, wherein an outer antenna connecting unit is formed on one side of the terminal holder so that an outer antenna installed outside of the vehicle is connected thereto, and the outer antenna connecting unit is electrically connected to the mobile phone when the mobile phone is accepted into the mobile phone accepting space.

27. The fusion monitor system according to claim 20, the display panel (701) further having an electronic module in order to directly connect a wireless sensor located in the vehicle and/or to directly connect the mobile phone (401) so that information received from the wireless sensor and the mobile phone (401) could be displayed on the display panel (701).

28. Fusion monitor system for vehicles comprising:
a sideview mirror unit including a housing of a cylindrical shape having one end disposed outside of a vehicle toward a rear side, the other end disposed inside the vehicle toward the rear side, an object lens system disposed on an outer end part of the housing and refracting the passed ray to be converged, an upper reflecting unit and a lower reflecting unit arranged in the housing at a predetermined angle within the focal length of the object lens so that a reciprocal contact line corresponds to a horizontal center line of the object lenses and interior angles arranged to make a right-angle, a third reflecting unit disposed out of the focal length of the object lens system for reflecting the ray reflected from the upper reflecting unit and from the lower reflecting unit to an inner end part of the housing, an eye lens system disposed on the inner end part of the housing and for forming an afocal optical system with the object lens system by refracting the ray so that an image reflected by the third reflecting unit is enlarged;
a terminal holder having a terminal acceptance space inside so that a part of a mobile phone is able to be accepted and disposed on one side of the housing;
a display panel having a display surface outputting information same as that on a display window of the mobile phone through a data communication with the terminal holder when the mobile phone is inserted into the terminal acceptance space, and installed so as to rotate between an output position disposed between the third reflecting unit and the eye lens system so that the display surface faces the eye lens system and a retraction position disposed on inner wall of the housing in parallel; and
a panel driving means making the display panel rotate between the output position and the retraction position.

29. The fusion monitor system according to claim 28, wherein the panel driving means includes a manual controlling handle connected to the rotating axis of the display panel for rotating the display panel to the output position or to the retracting position.

30. The fusion monitor system according to claim 28 further comprising a handle position fixing means for fixing the manual controlling handle on the output position and on the retracting position respectively.

31. The fusion monitor system according to claim 28, wherein the panel driving means includes a driven gear coupled to the rotating axis of the display panel to be rotated as a single body with the rotating axis, a driving gear meshed to the driven gear so as to be rotated, and a driving motor for reciprocally rotating the driving gear.

32. The fusion monitor system according to claim 28 further comprising at least one optical lens for compensating distortion disposed between the eye lens system and the display panel for compensating a distortion generated on the display surface of the display panel viewed through the eye lens.

33. The fusion monitor system according to claim 28 further comprising at least one lighting installed for lighting the display surface of the display panel.

34. The fusion monitor system according to claim 28 further comprising at least one of voice outputting means installed on one side of the terminal holder so as to be connected electrically with the mobile phone for outputting voice information of the mobile phone, and of voice inputting means for inputting voice information from outside to the mobile phone.

35. The fusion monitor system according to claim 28, wherein a power source connecting unit is formed on the terminal holder so as to accept the other end of a power connecting cord whose one end is connected to a cigar lighter jack of the vehicle.

36. The fusion monitor system according to claim 28, wherein a keyboard having a plurality of controlling keys corresponding to controlling keys of the mobile phone, and keyboard connecting unit is formed on one side of the terminal holder so as to connect to the mobile phone and to connect with the keyboard.

37. The fusion monitor system according to claim 28, wherein an outer antenna connecting unit is formed on one side of the terminal holder so that an outer antenna installed outside of the vehicle is connected thereto, and the outer antenna connecting unit is electrically connected to the mobile phone when the mobile phone is accepted into the mobile phone accepting space.

38. The fusion monitor system according to claim 28, the display panel (701) further having an electronic module in order to directly connect a wireless sensor located in the vehicle and/or to directly connect the mobile phone (401) so that information received from the wireless sensor and the mobile phone (401) could be displayed on the display panel (701).

* * * * *

UNITED STATES PATENT AND TRADEMARK OFFICE
CERTIFICATE OF CORRECTION

PATENT NO.     : 6,844,966 B2
DATED          : January 18, 2005
INVENTOR(S)    : Myung-Duk Kho and Jung-Hyun Kho It is certified that error appears in the above-identified patent and that said Letters Patent is hereby corrected as shown below:

Column 15,
Line 30, should read -- the object lens and interior angles arranged to make --

Column 17,
Line 2, should read -- the object lens and interior angles arranged to make --

Column 19,
Line 12, should read -- lens and interior angles arranged to make a right- --

Signed and Sealed this

Twenty-fourth Day of May, 2005

JON W. DUDAS
*Director of the United States Patent and Trademark Office*